United States Patent
Walavalkar et al.

(10) Patent No.: US 9,871,694 B1
(45) Date of Patent: Jan. 16, 2018

(54) PARALLEL PROCESSING FOR TRANSACTION DATA GENERATION

(71) Applicant: Amazon Technologies, Inc., Seattle, WA (US)

(72) Inventors: Onkar Bhaskar Walavalkar, Seattle, WA (US); Krishnan Ananthanarayanan Kolazhi, Bellevue, WA (US); Gautham Anjan Reddy, Redmond, WA (US); Purbesh Sahoo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 237 days.

(21) Appl. No.: 14/751,077

(22) Filed: Jun. 25, 2015

(51) Int. Cl.
*G06F 15/177* (2006.01)
*H04L 12/24* (2006.01)
*H04L 29/06* (2006.01)
*G06Q 30/06* (2012.01)

(52) U.S. Cl.
CPC ..... *H04L 41/0803* (2013.01); *G06Q 30/0601* (2013.01); *H04L 67/40* (2013.01)

(58) Field of Classification Search
CPC .. H04L 41/0803; H04L 67/40; G06Q 30/0601
USPC ....................................................... 709/220
See application file for complete search history.

(56) References Cited

U.S. PATENT DOCUMENTS

2017/0004422 A1* 1/2017 Todd .................. G06Q 20/20

OTHER PUBLICATIONS

U.S. Appl. No. 14/752,795, filed Jun. 26, 2015, Amol Madhav Joshi et al.
U.S. Appl. No. 14/751,074, filed Jun. 25, 2015, Onkar Walavalkar, et al.
U.S. Appl. No. 14/751,077, filed Jun. 25, 2015, Onkar Walavalkar, et al.

* cited by examiner

*Primary Examiner* — Wing F Chan
*Assistant Examiner* — Joseph Maniwang
(74) *Attorney, Agent, or Firm* — Robert C. Kowert; Meyertons, Hood, Kivlin, Kowert & Goetzel, P.C.

(57) ABSTRACT

Techniques are described for parallel processing of items, specified for purchase in a transaction. A transaction request may be received, specifying a plurality of items in a transaction. Multiple subsets of one or more items may be determined that are suitable for parallel processing by multiple instances of a network services, the subsets determined based on configuration information describing a parallel processing capability of the network service specified during registration. Multiple service calls may be made to cause the multiple instances of the network service to generate transaction data corresponding to the subsets. The transaction data may be incorporated into an aggregate contract data object on receipt, and provided to client process(es) for presentation via a user interface such as an e-commerce application.

20 Claims, 14 Drawing Sheets

PARALLEL PROCESSING FOR TRANSACTION DATA GENERATION

BACKGROUND

A business or other organization may deploy software to provide various services related to online shopping, electronic commerce, digital media delivery, gaming, communications, web search, social networking, and so forth. Such services may be provided through one or more software systems executing on the computing devices, as in a distributed software deployment on the computing devices. In some cases, distributed software may include front-end software that provides an interface with end-users, and back-end software that processes data received from the front-end software and generates data to be presented through the front-end software. To improve the experience of end-users interacting with the interface, an organization may seek ways to reduce the latency of generating the data to be presented via the front-end software or to expedite the delivery of the data to the front-end software.

Figure 1:
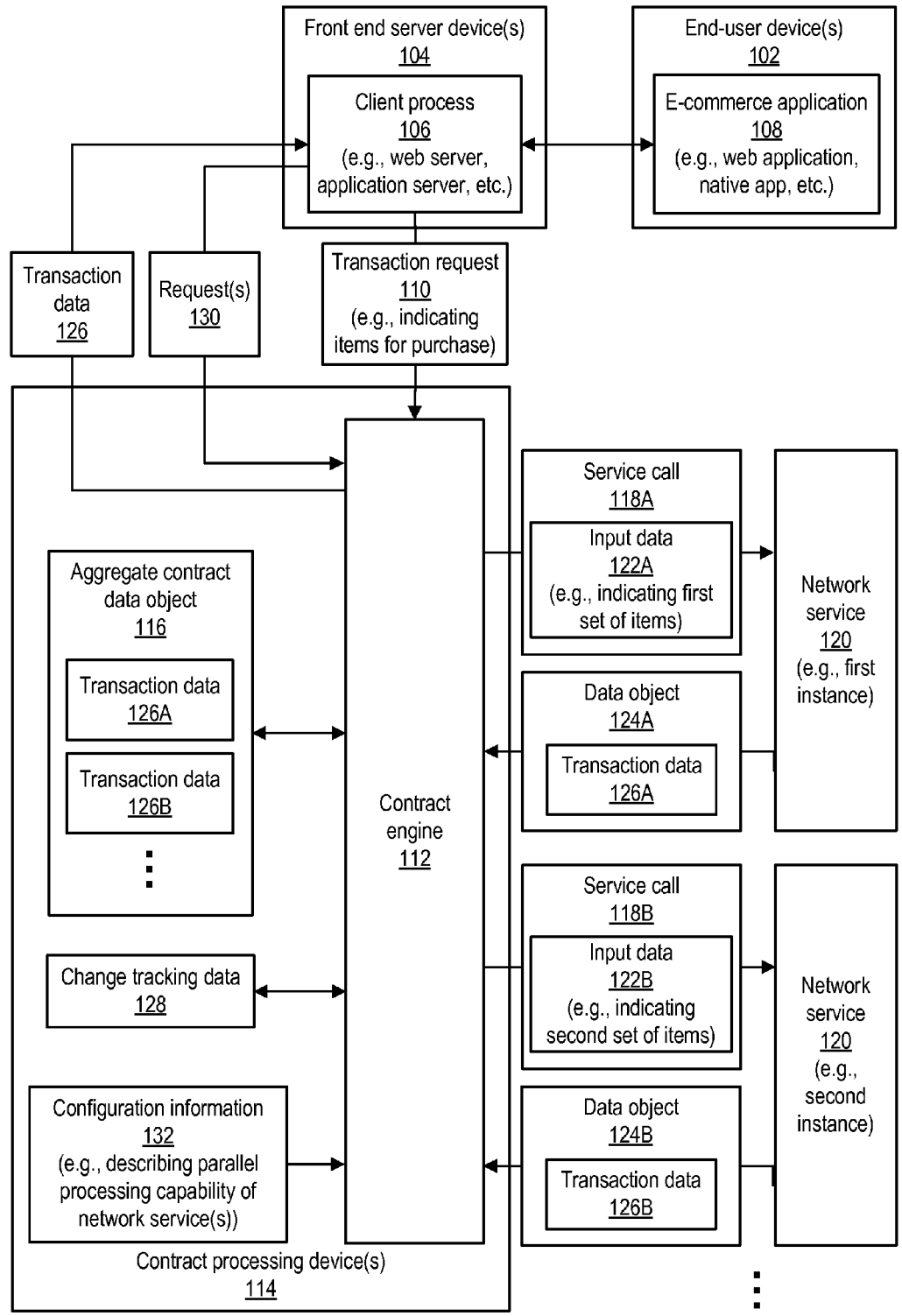
FIG. 1 is a block diagram illustrating an example environment in which a contract engine performs parallel calls to multiple instances of a network service to generate transaction data, according to embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems, devices, methods, and computer-readable media for processing transaction requests generated by client processes, and providing transaction data to the client processes describing the transaction. In some embodiments, a transaction request is received from a client process, such as a web server, application server, or other front-end process configured to provide content to be presented in a web application, native application, or other user interface (UI). In some cases, the transaction request may be associated with a plurality of items identified by an end-user using the UI. For example, a transaction request may identify one or more items for purchase via an e-commerce application such as an online store, merchant web site, shopping application, and so forth. The transaction request may be received and analyzed to identify multiple items, or subsets of items, which may be processed in parallel. A plurality of calls may be made to cause a plurality of instances of a network service to be executed in parallel to process the multiple items, or multiple subsets of items. Each instance of a network service may generate a data object that comprises transaction data generated by an item or subset of items. The multiple sets of transaction data in the plurality of data objects may be incorporated into an aggregate data object. The client process may receive transaction data from the aggregate data object and present at least a portion of the transaction data within an e-commerce application or other UI.

For example, a network service may be configured to determine an estimated delivery date or time for an item or set of items. In cases where a transaction request specifies a plurality of items for purchase, embodiments may identify multiple subsets of items where each subset may include one or more items. The subsets may be determined based on the shipping address of the various items, such that each subset of items includes those item(s) to be shipped to a particular shipping address. Multiple instances of the network service may be called in parallel, and each call may specify a subset of items to be processed. Each instance of the network service may determine an estimated delivery date, time, or date and time when the subset of items may be delivered to a recipient at a shipping address. Each instance of the network service may generate a data object that includes the transaction data, e.g., the estimated delivery date and/or time. The data objects may be received by a contract engine that incorporates the estimated delivery information into an aggregate contract data object. In some cases, the contract engine may combine the various delivery date estimates to determine an overall delivery date estimate for the entire order. For example, the overall delivery date estimate may be calculated as the latest date and/or time among the various delivery date estimates for the various subsets of items.

In some cases, a transaction request may specify an order that includes a large number of items (e.g., in the hundreds or thousands or more) for purchase. By dividing the transaction request into multiple subsets of items, and processing each subset independently and in parallel, embodiments may provide faster transaction processing than traditional methods which may process all the items in a single call to a single instance of a network service. Such faster processing may enable the transaction data for a transaction to be generated and made available more quickly for presentation to an end-user via an e-commerce application or other UI. Through parallel processing of subsets of items in a transaction, embodiments may enable the processing of transactions and contract handling to scale up to an arbitrary transaction size without incurring additional latency.

Embodiments may also expedite the delivery of transaction data to a client process by employing asynchronous communication methods. Embodiments support at least two mechanisms for asynchronously communicating transaction data to a client process. In some embodiments, a transaction request may be sent by a client process to a contract engine, and the contract engine may then make multiple calls to cause multiple network services to generate different types of transaction data. The various portions of transaction data returned by the network services may be incorporated into an aggregate contract data object as the portions are received at the contract engine. Using a first mechanism for asynchronous communication, at some time after sending the transaction request the client process may send one or more subsequent requests to request portion(s) of the generated transaction data. In some embodiments, the subsequent request(s) may be processed synchronously. For example, a subsequent request may cause the contract engine to retrieve the requested portion of transaction data from the aggregate contract data object and return the requested portion to the client process. In some cases, the contract engine may block on the request until the requested portion of transaction data has been generated and incorporated into the aggregate contract data object. In this mechanism, the subsequent request(s) may be received and processed asynchronously with respect to the sending and processing of the initial transaction request. The subsequent request(s) may then be processed synchronously with respect to the sending of the requested portion(s) of transaction data in response to the request(s).

In a second mechanism for asynchronously communicating the transaction data, the initial transaction request may include callback information specifying a network location at which the client process may receive transaction data. For example, the callback information may specify a Uniform Resource Identifier (URI) such as a Uniform Resource Name (URN) or Uniform Resource Locator (URL). The callback information may include a network address, such as an Internet Protocol (IP) address. The callback information may specify a host name or a domain name of a computing device, or a port number of a network interface at the computing device. In some cases, the callback information may specify the address of a load balancer, network gateway, or other device that mediates communicates with multiple other devices. The callback information may specify a virtual IP address. When at least a portion (e.g., all) of the transaction data for a transaction has been generated and stored in the aggregate contract data object, the contract engine may communicate at least a portion of the transaction data to the client process using the network location specified in the callback information. In some embodiments, the communication of the transaction data using the callback information may be performed asynchronously with respect to the receiving and processing of the transaction request that caused the generation of the transaction data.

In traditional methods, a client process may send a transaction request and receive transaction data synchronously with respect to the processing of the transaction request. For large transaction involving a large number of items, such synchronous process may lead to high latencies in generating and presenting the transaction data to an end-user, potentially leading to a negative user experience. In some embodiments described herein, the transaction data may be sent to the client process incrementally in multiple portions as it is generated and stored in the aggregate contract data object. Such sending may be performed in response to multiple, subsequent requests sent to the client process to request particular portions of the transaction data. By enabling incremental delivery of transaction data even before all of the transaction data has been generated, embodiments enable the transaction data, or a portion of the transaction data, to be provided by the client process and presented to an end-user faster than traditional methods.

As used herein, a date may describe a particular date or range of dates according to any calendar. A date may include a day of the week (e.g., Wednesday), a day of the month (e.g., the 4th), a month of the year (e.g., January), year, and so forth. A date may also include an indication of date, time, or date and time relative to a current date or time (e.g., three days from now). A date may also include a time or range of times specified to any degree of precision, such as an hour, minute, second, fraction of second, and so forth.

As used herein, parallel processes may describe multiple processes that operate at least partly contemporaneously such that the durations of the processes at least partly overlap in time. Parallel processes may begin at different times, end at different times, or begin and end at different times, so long as there is a period of time (however short) during which both processes are operating simultaneously.

As used herein, a module may describe software that is executing or configured to be executable. A module may include, but is not limited to, one or more of an application, an app, a process, a thread, an executable library, an executable interface, and so forth. In some cases, a module may include elements that are presented to a user such as in a UI. Such elements may be configured to output information to the user, receive input information from the user, or to both provide output and receive input. In some cases, a module may include an interface or other elements for exchanging information with other module(s), such as an application programming interface (API). A module may include machine-executable instructions that execute on a processor to perform actions. A module may also include bytecodes, intermediate language instructions, scripts, or other data that is configured to execute with a virtual machine (VM), runtime engine, or other process.

As used herein a synchronous process may describe a process that is initiated in response to, or within a same execution path, as a triggering event or condition. A synchronous process may also be described as being performed dynamically or in real time with respect to the triggering event or condition, within a predetermined (e.g., brief) period of time relative to the occurrence of the triggering event or condition. For example, the processing of a request to generate a response may be described as synchronous, with respect to receiving the request, if a particular process receives the request and responds to the request within a same execution path. The synchronous processing of a request to generate a response may be described as a blocking operation, in that the responder may not process other requests until the initial request is processed and a response is sent.

As used herein, an asynchronous process may describe a process that operates out-of-band or offline with respect to a triggering event or condition. An asynchronous process may also be described as a static process or batch process. For example, the processing of a request to generate a response may be described as asynchronous, with respect to receiving the request, if the responder generates and sends a response at a time or via a process that is, to some extent, independent of the timing of receiving the request.

As used herein, a data object may include any amount of data arranged in any format, or unformatted data. A data object may include data that is encrypted using any encrypted method or unencrypted. A data object may include data that is compressed using any compression algorithm or uncompressed. A data object may be stored in persistent memory. A data object may also be present in active, physical memory employed by a module.

FIG. 1 illustrates an example environment in which one or more embodiments may operate. As shown in FIG. 1, the environment may include one or more end-user devices 102. The end-user device(s) 102 may include any type of computing device, including but not limited to tablet computers, laptop computers, desktop computers, telephones, gaming device, home entertainment system, and so forth. The environment may also include one or more front end server devices 104. The front end server device(s) 104 may execute any number of client processes 106. The client process(es) 106 may be configured to generate an e-commerce application 108, or any other type of application, for presentation on the end-user device(s) 102. For example, the client process(es) 106 may include a web server, application server, or other software module(s) configured to provide an e-commerce application comprising one or more web pages that may be presented through a web browser executing on the end-user device(s) 102. The client process(es) 106 may also be configured to generate and communicate content to be presented on other types of e-commerce applications 108. For example, the e-commerce application 108 may be a native application configured to execute on the end-user device(s) 102, and the e-commerce application 108 may present content generated by the client process(es) 106.

The client process(es) 106 may communicate one or more transaction requests 110 to a contract engine 112 executing on one or more contract processing device(s) 114. In some embodiments, the contract processing device(s) 114 may include one or more backend server devices that operate within a system for providing an e-commerce service to end-users. In such cases, the contract engine 112 may include any number of software modules that execute to receive, generate, send, or otherwise process data related to a contract within the e-commerce service. For example, the contract engine 112 may process a purchase contract or other type of contract arising from an end-user's selection of one or more items to be purchased via the e-commerce application 108. In some embodiments, the contract engine 112 may be a backend service that is not directly accessible by end-users (e.g., customers). Alternatively, the contract engine 112 may provide a user interface (UI) or other features configured to interact directly with an end-user. The contract engine 112 may be configured to support contract creation, aggregation, validation, signing, or other operations with respect to a contract for a transaction.

The client process(es) 106 may include front end processes that provide the e-commerce application 108 having an interface, such as a web interface or other UI accessible by end-users of the end-user device(s) 102. The action(s) of an end-user in the UI provided by the client process(es) 106 may generate one or more transaction requests 110 that are processed by the contract engine 112. For example, and end-user may select one or more items for purchase through the e-commerce application 108 such as an online store, e-commerce web site, shopping app, or other UI provided by the client process(es) 106. The client process(es) 106 may then generate the transaction request(s) 110 to indicate that a purchase contract is to be created to manage the end-user's purchase of the item(s) through the e-commerce application 108. The contract engine 112 may generate an aggregate contract data object 116 that includes transaction data 126 associated with the contract. In some cases, at least some of the transaction data 126 included in the aggregate contract data object 116 may be communicated to the client process(es) 106 and presented, through the e-commerce application 108, to the end-user whose interaction(s) with the e-commerce application 108 caused the transaction request(s) 110 to be sent.

In some embodiments, the contract engine 112 may make any number of service calls 118 to network services 120, to cause the network service(s) 120 to generate the transaction data 126 to store, or otherwise incorporate into, the aggregate contract data object 116. In response to receiving a transaction request 110 from the client process(es) 106, contract engine 112 may initialize the aggregate contract data object 116 and begin sending the service call(s) 118 to instruct the network service(s) 120 to generate the transaction data 126 to store in the aggregate contract data object 116. For example, in cases where the transaction request 110 indicates a purchase of one or more items through the e-commerce application 108, the aggregate contract data object 116 may include data describing one or more aspects of the contract governing the purchase. The aggregate contract data object 116 may store any amount of transaction data 126 that describes any aspect of the contract including, but not limited to, the purchase price, taxes, discounts, gift information, item(s) to be purchased, description of item(s), quantity of item(s) to be purchased, availability of item(s), shipping date or time estimate, shipping method, requested delivery period, seller of the item(s), manufacturer of the item(s), buyer's name, recipient's name, buyer's location, recipient's location, shipping address, payment information, and so forth.

On receiving the transaction request 110, the contract engine 112 may create an initial aggregate contract data object 116. The initial aggregate contract data object 116 may include information that the contract engine 112 is able to determine based on the transaction request 110 itself, but the initial aggregate contract data object 116 may otherwise be a shell object into which subsequently generated transaction data 126 is to be written. To populate the aggregate contract data object 116, the contract engine 112 may perform any number of service calls 118 to one or more network services 120. Each service call 118 may include input data 122, and may call a network service 120 that is configured to process the input data 122 and generate transaction data 126 based on the input data 122. For example, the contract engine 112 may perform a service call 118 that includes input data 122 describing the purchase price of item(s) in a purchase, and location information regarding the buyer. The service call 118 may be to a network service 120 that is configured to calculate an amount of tax to be paid with the purchase, based on the purchase price and the location information, or other input data 122. The network service 120 may generate and return transaction data 126 that includes the calculated amount of tax. The contract engine 112 may then incorporate the received transaction data 120 into the aggregate contract data object 116. Alternatively, one or more network services 120 may have (e.g., direct) access to the aggregate contract data object 116, and may be configured to store the transaction data 126 in the aggregate contract data object 116 without sending the transaction data 126 to the contract engine 112.

The network service(s) 120 may be configured to perform operations including, but not limited to, one or more of the following: calculate taxes based on purchase price, location, or other input data; determine availability of item(s) to be purchased; determine an estimated delivery time, date, or time and date for delivering purchased item(s); validate or process a gift certificate, credit card, bank card, store credit, or other method of purchase; process gift information, such as a gift certificate amount, gift message, gift wrapping options, and so forth; determine address information, contact information, or other stored data associated with a buyer or recipient of a purchase; determine information describing the seller, manufacturer, distributor, or other entity associated with the item(s); or other operation(s).

In some embodiments, the network service(s) 120 may be remote with respect to the contract engine 112, executing on different computing device(s) than the contract engine 112. In such cases, the service call(s) 118 and the transaction data 126 may be communicated over one or more networks such as wide area networks (WANs) or local area networks (LANs). In some cases, one or more of the service call(s) 118 or the transaction data 126 may be encrypted for communication. In some embodiments, one or more of the network services 120 may be a local service with respect to the contract engine 112, such that the network service(s) 120 execute on a same computing device or cluster of devices as the contract engine 112.

In some embodiments, the contract engine 112 may generate change tracking data 128. The change tracking data 128 may describe the transaction data 126 that has been added to the aggregate contract data object 116. The change tracking data 128 may also describe one or more portions of transaction data 126 to be added to the aggregate contract data object 116. Accordingly, the change tracking data 128 may be described as a task list comprising: completed tasks, for which the transaction data 126 has been added to the aggregate contract data object 116; and incomplete tasks, for which the transaction data 126 has not yet been generated or added to the aggregate contract data object 116. The change tracking data 128 may indicate when particular instances of transaction data 126 were added to the aggregate contract data object 116, and which network service(s) 120 generated the transaction data 126. The change tracking data 128 may also indicate when the service call(s) 118 were made to the network service(s) 120 to request determination of transaction data 126 to be added to the aggregate contract data object 116.

In some embodiments, as shown in FIG. 1, the contract engine 112 may send the service call(s) 118 to the network service(s) 120, and receive the data object(s) 124 including the transaction data 126 from the network service 120. Alternatively, one or both of the sending of the service call(s) 118 or the receiving of the data object(s) 124 may be via a mediator service that may operate as an intermediary between the contract engine 112 and the network service(s) 120.

The contract engine 112 may be configured to generate, maintain, update, and provide an aggregate contract data object 116. In some embodiments, the contract engine 112 might be utilized in conjunction with software components and hardware devices that provide e-commerce functionality. For example, and without limitation, the technologies disclosed herein may be utilized with an online shopping or other e-commerce module (not shown) that provides a web site or other type of site for online shopping. The online shopping module may be configured to maintain and utilize an item catalog data store (e.g., an "item catalog") that stores records for items available for purchase through the web site. The web site may also provide functionality for browsing and searching for web pages corresponding to items in the item catalog, for purchasing the items, and for performing other functions. The technologies disclosed herein might also be utilized with other types of e-commerce systems. In this regard, it should be appreciated that the configurations disclosed herein are not limited to use by e-commerce systems and may be utilized to optimize the process of data aggregation in other technical environments.

In cases where the contract engine 112 is utilized in conjunction with an online shopping module, such as that described above, the aggregate contract data object 116 may be utilized to store data associated with a customer purchase such as purchase contract data. For example, and without limitation, the transaction data 126, and other information in the aggregate contract data object 116, may describe items to be purchased by the customer, payment information, customer information such as a billing or delivery address, or other types of information relating to a purchase contract.

The contract engine 112 may obtain the data to be stored in the aggregate contract data object 116 from any number of the network services 120. For example, and without limitation, the contract engine 112 may make one or more service calls 118 that comprise one or more input values of input data 122 to the network service(s) 120. In response to the service call(s) 118, the network service(s) 120 may perform various types of processing to generate instances of the transaction data 126 for inclusion in the aggregate contract data object 116. Various other services may then access at least a portion of the transaction data 126 stored in the aggregate contract data object 116. In some cases, the client process(es) 106 may access the transaction data 126 of the aggregate contract data object 116 and present such data through the e-commerce application 108 or other UI. For example, the client process(es) 106 may access transaction data 126 describing an estimated delivery or shipping date for item(s), calculated tax to be paid, total cost, gift information, description(s) of item(s), seller information, or other transaction data 126 after such data has been stored in the aggregate contract data object 116. The client process(es) 106 may then cause at least a portion of the transaction data 126 to be presented to an end-user via the e-commerce application 108.

A transaction request 110 may indicate a plurality of items for purchase or otherwise. In some embodiments, the contract engine 112 may analyze the transaction request 110 and determine that different items, or different subsets of items, may be processed separately and in parallel by one or more network service(s) 120. In such cases, the contract engine 112 may send multiple service calls 118 to multiple instances of a particular network service 120, as shown in FIG. 1. Each of the multiple service calls 118 may specify, as input data 122, a different subset of one or more items. The multiple instances of the network service 120 may then execute, in parallel, to process the multiple subsets of (one or more) items and generate multiple instances of transaction data 126 that are communicated to the contract engine 112 in multiple data objects 124. For example, each item may be sent individually to a different instance of a network service 120 to calculate a tax amount associated with the purchase price of the item. As another example, each item may be sent individually to a different instance of a network service 120 to determine a (e.g., legal) seller of the item, or to retrieve other description information regarding the item.

In cases where the network service 120 is configured to determine an estimated delivery or shipping date for item(s), different subsets of the items may be sent to different instances of the network service 120 for parallel processing, where each subset may include those items that are to be shipped to a particular destination. In such cases, as shown in FIG. 1, a service call 118A may specify input data 122A indicating a first set of items to be shipped to a first destination. A service call 118B may specify input data 122B indicating a second set of items to be shipped to a second destination. A first instance of the network service 120 may execute to process the input data 122A and determine a first estimated delivery date based on the first destination and the availability of the first set of items. The first estimated delivery date may be communicated as transaction data 126A in a data object 124A sent to the contract engine 112. A second instance of the network service 120 may execute to process the input data 122B and determine a second estimated delivery date based on the second destination and the availability of the second set of items. The second estimated delivery date may be communicated as transaction data 126B in a data object 124B sent to the contract engine 112. The contract engine 112 may then process the transaction data 126A and the transaction data 126B and incorporate both instances of transaction data 126 into the aggregate contract data object 116.

In some embodiments, the contract engine 112 may access configuration information 132 to determine whether, and how, to divide the plurality of items into multiple subsets of items. The configuration information 132 may describe, for each of one or more network service(s) 120, a parallel processing capability of the network service 120. For example, the configuration information 132 may indicate that a network service 120 is capable of processing individual items separately (e.g., to determine a tax amount), or capable of processing set of items that share a common attribute (e.g., delivery address, to estimate a delivery date). The configuration information is described further with reference to FIG. 4.

Subsequent to sending the transaction request 110, the client process 106 may send one or more requests 130 for at least a portion of the transaction data 126 stored in the aggregate contract data object 116. In some embodiments, the request(s) 130 may be via an API that is exposed or otherwise provided by the contract engine 112. In receiving a request 130 that specifies a portion of the transaction data 126, the contract engine 112 may retrieve the specified portion of transaction data 126 from the aggregate contract data object 116 and send the specified portion of the transaction data 126 to the client process 106 in response to the request 130. In some embodiments, as described further with reference to FIGS. 9 and 11, the specified portion of the transaction data 126 may be sent in a synchronous response to the request 130. In some embodiments, as described further with reference to FIGS. 10 and 12, a portion or all of the transaction data 126 may be retrieved by the contract engine 112 from the aggregate contract data object 116 and sent to the client process 106 not in response to any request 130, but in a communication that is asynchronous with respect to the initial transaction request 110. In such cases, the transaction data 126 or a portion thereof may be sent to a network location specified in callback information provided by the client process 106.

In some embodiments, if a network service 120 failed to generate at least a portion of the transaction data 126, the contract engine 112 may send a failure message in response to a request 130 from the client process 106. The failure message may include exception information, error information, or other information indicating a reason for the failure. In some cases, such information may be generated by the network service 120 that failed to generate the transaction data 126, and the information may be passed along to the client process 106 in response to the request 130. A failure may also occur if the contract engine 112 failed to store the transaction data 126 in the aggregate contract data object 116.

Figure 2:
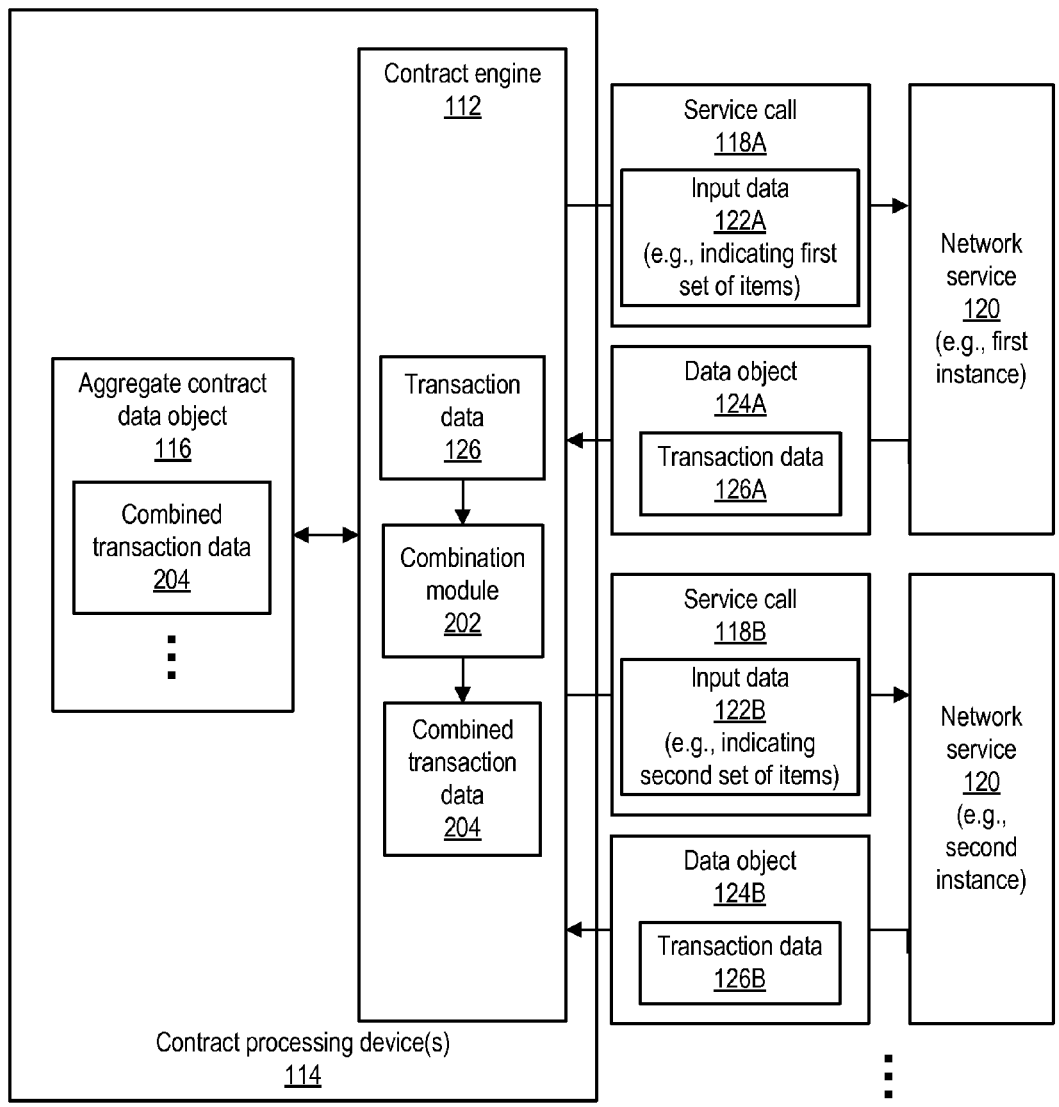
FIG. 2 is a block diagram illustrating an example environment in which a contract engine performs parallel calls to multiple instances of a network service to generate transaction data, which is then combined and stored in an aggregate data object, according to embodiments.

In some embodiments, as shown in FIG. 1, the contract engine 112 may incorporate the data objects 124, or the transaction data 126 communicated in the data objects 124, into the aggregate contract data object 116 as the data objects 124 are received by the contract engine 112. In some embodiments, the contract engine 112 may process the transaction data 126 prior to incorporating it into the aggregate contract data object 116. Such embodiments are illustrated in FIG. 2. As shown in FIG. 2, the contract engine may include a combination module 202 that accesses multiple instances of transaction data 126 generated by multiple network services 120, or multiple instances of a particular network service 120. The combination module 202 may combine, merge, add, correlate, or otherwise process the multiple instances of the transaction data 126 to generate combined transaction data 204, which may then be incorporated into the aggregate contract data object 116. For example, in cases where multiple instances of a network service 120 execute in parallel to determine an estimated delivery date, or estimated shipping date, for multiple subsets of items, the combination module 202 may process the multiple estimated delivery dates to generate combined transaction data 204 comprising an overall estimated delivery date for the entire purchase. In some cases, the overall estimated delivery date may be determined as the latest date among the individual estimated delivery dates for the various subsets of items. As another example, in cases where multiple instances of a network service 120 execute in parallel to determine a tax amount for different items or subsets of items, the combination module 202 may add the multiple calculated tax amounts to determine combined transaction data 204 that describes a total tax amount. The combination module 202 may perform any operations to combine, correlate, add, filter, or otherwise process multiple instances of transaction data 126 to generate combined transaction data 204 for inclusion in the aggregate contract data object 116.

Figure 3:
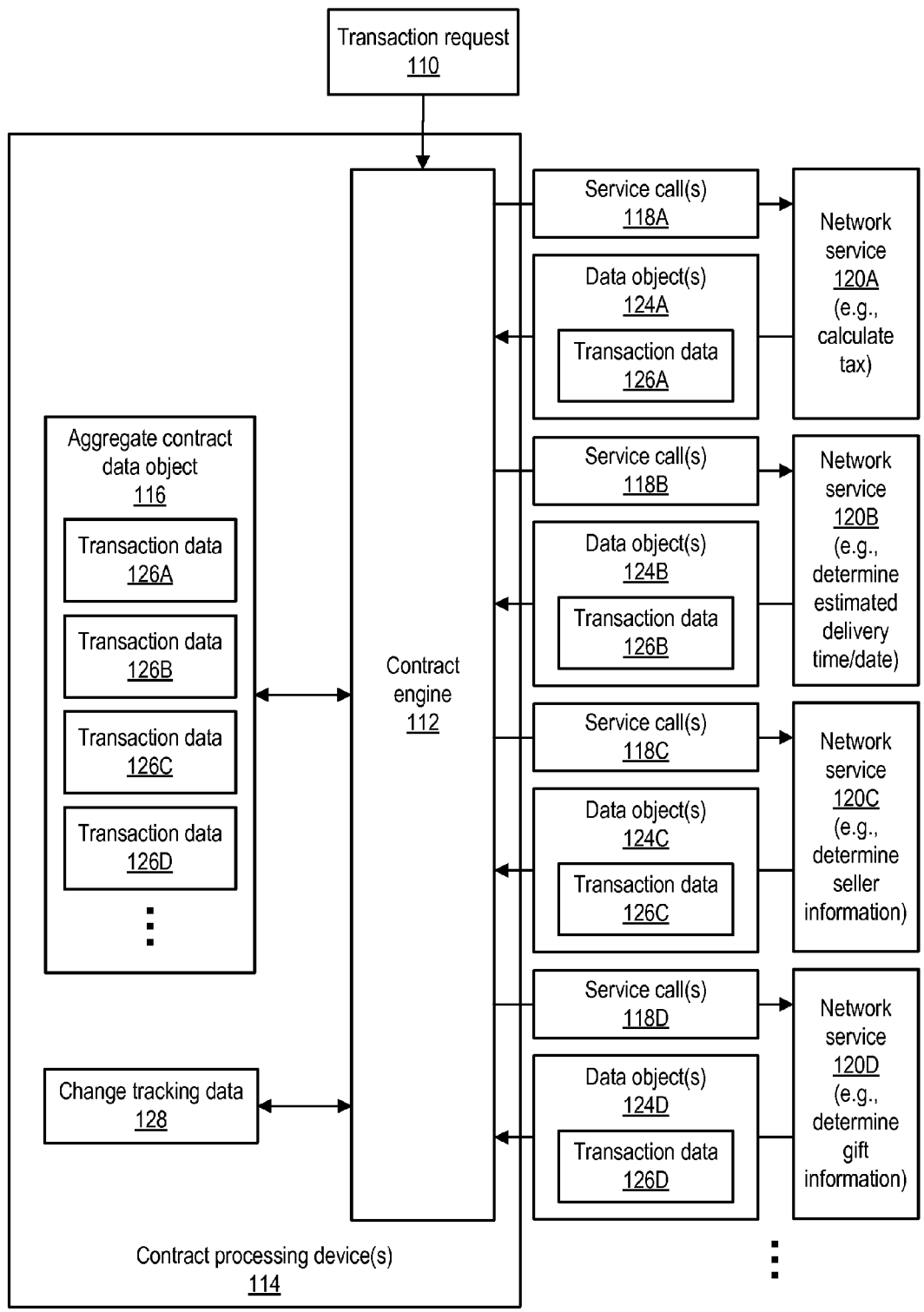
FIG. 3 is a block diagram illustrating an example environment in which a contract engine performs multiple calls to multiple network services to generate different types of transaction data to be stored in an aggregate data object, according to embodiments.

FIG. 3 illustrates an example of a contract engine 112 calling multiple network services 120 to generate different types of transaction data 126. In the example of FIG. 3, the contract engine 112 may make a service call 118A to a network service 120A to generate transaction data 126A describing a calculated tax amount for one or more items. The contract engine 112 may make a service call 118B to a network service 120B to generate transaction data 126B describing an estimated delivery date, or shipping date, for one or more items. The contract engine 112 may make a service call 118C to a network service 120C to generate transaction data 126C describing seller information for one or more items, or including other item description information. The contract engine 112 may make a service call 118D to a network service 120D to generate transaction data 126D gift information for one or more items, such as gift wrap options, gift messages, gift certificate amounts, and so forth. Other network service(s) 120 may generate other types of transaction data 126, including but not limited to payment information, discount amounts, refund information, and so forth. In some cases, a network service 120 may operate independently of other network service(s) 120, such that the timing or completion of the processing performed by the network service 120 may not depend on the operations of the other network service(s) 120. In some cases, a network service 120 may take, as the input data 120, transaction data 126 that was previously generated by the operations of other network service(s) 120.

Each of the multiple instances of transaction data 126 may be sent to the contract engine 112, e.g., in a data object 124, and incorporated into the aggregate contract data object 116. For each of the network service(s) 120 available in the environment, the contract engine 112 may, if appropriate, make multiple service calls 118 to multiple instances of the network service 120 to cause the parallel processing of multiple portions of the transaction (e.g., multiple subsets of items). In some embodiments, the different calls to different network services 120A, 120B, 120C, 120D, and so forth, may also be made in parallel such that the different network services 120 execute in parallel to generate different types of transaction data 126. Accordingly, embodiments support at least two dimensions of parallel processing: parallel processing of different portions (e.g., different subsets of items) of the transaction; and parallel processing to generate different types of the transaction data 126 for a transaction.

When utilized in conjunction with an e-commerce system, the network service(s) 120 may be configured to provide various types of information about a customer purchase for storage in the aggregate contract data object 116 and use by the client process(es) 106 or other services. For example, and without limitation, one network service 120A may be utilized to provide transaction data 126A that includes a customer's shipping address, while another network service 120B may be configured to provide transaction data 126B that includes information about the item(s) to be purchased. Other network service(s) 120 may compute the sales tax for the purchase, the shipping cost, or the total purchase price for the purchase, and return the computed information as the transaction data 126 to the contract engine 112. Other network service(s) 120 may provide other types of transaction data 126. The transaction data 126 returned by the network service(s) 120 may be stored in the aggregate contract data object 116. The contract engine 112 may also provide functionality enabling the client process(es) 106 or other services to retrieve or modify the data stored in the aggregate contract data object 116.

In some cases, the types or instances of data stored in the aggregate contract data object 116 may have various interdependencies, such that the modification of one portion or instance of transaction data 126 may cause the updating of other portion(s) or instance(s) of transaction data 126. For example, if data is added to the aggregate contract data object 116 describing an additional item to be purchased by a customer, additional network service call(s) 118 may be made to network service(s) 120 to update the data in the aggregate contract data object 116 describing the total order price, the shipping cost, delivery estimates, whether free shipping is available, or other types of information. Other service call(s) 118 may be made based upon other changes or additions to the data in the aggregate contract data object 116.

To update the transaction data 126 in the aggregate contract data object 116, the contract engine 112 may make one or more service calls 118 to the appropriate network service(s) 120. In some cases, a short period of time may have elapsed since a previous service call 118 such that the input data 122 to a network service 120 may not have changed since the previous call, and such that the transaction data 126 returned by the network service 120 is not likely to have changed. For example, if the items in a customer purchase from an e-commerce application 108 have not changed, then there may be a high probability that there is no change in the shipping cost for the item(s), unless other data has since changed that may impact the shipping cost, such as the shipping address. In this example, a service call 118 may be made to a network service 120 unnecessarily, thereby increasing latency or reducing availability of the network service 120 or the contract engine 112. This may be particularly true when there is a large amount of data in the aggregate contract data object 116 or when there are a large number of network services 120 to be called. Accordingly, in some embodiments at least a portion of the transaction data 126 may be accessed from a cache instead of repeating a service call 118 to a network service 120, in cases where the transaction data 126 is unlikely to have changed since a previous call. In some embodiments, the data may be cached with a time-to-live (TTL) indicating how long since the data has been cached and how fresh the cached data is. Cached data with a high TTL may be not used, and instead a service call 118 may be made to request updated transaction data 126 from the network service 120. Older cached data may be purged from the cache, and replaced with updated transaction data 126.

Another mechanism that the contract engine 112 may utilize to avoid unnecessary network service calls 118 to network services 120 involves the use of the change tracking data 128. In some embodiments, the contract engine 112 may be configured to track changes to data in the aggregate contract data object 116. For example, and without limitation, the contract engine 112 might maintain the change tracking data 128 that describes the changes to the various instances of transaction data 126 in the aggregate contract data object 116. When the contract engine 112 determines that a second or subsequent call to a network service 120 may be necessary (e.g. as a result of the modification of data in the aggregate contract data object 116), the contract engine 112 may employ the change tracking data 128 to determine whether the data in the aggregate contract data object 116 that is used as input data 122 to the network service 120 has changed since the previous service call 118 to the network service 120. If the change tracking data 128 indicates that the input data 122 has not changed, the contract engine 112 may not make an additional service call 118 to the network service 120. The caching mechanism and the change tracking mechanism described above may be utilized in any combination in some embodiments.

The contract engine 112 may also utilize a filtering mechanism to perform caching on a more granular level than at the level of a single instance of transaction data 126, and to make communication with the network service(s) 120 more efficient. The network service(s) 120 may be configured to provide filtering data to the contract engine 112. The filtering data may describe the specific data from the aggregate contract data object 116 that each network service 120 utilizes. For example, and without limitation, a network service 120A might provide filtering data indicating that the network service 120A is to be subsequently called if (e.g., only if) particular field(s) of transaction data 126 are changed in the aggregate contract data object 116. Similarly, a network service 120B might provide filtering data indicating that the network service 120B is to be subsequently called if other field(s) are changed. Based on the filtering data, the contract engine 112 may call network service(s) 120 a subsequent time if the data specified by the network service(s) 120 in the filtering data has changed (and the associated TTL has not elapsed). Additionally, the contract engine 112 may utilize the filtering data to minimize the amount of data sent to a network service 120 in a service call 118. For example, the field(s) specified in the filtering data may be provided to the network service(s) 120 as input data 122.

In some cases, the contract engine 112 may be configured to be expandable to support additional network service(s) 120 providing additional transaction data 126. In some embodiments, a new network service 120 may register itself with the contract engine 112 to indicate one or more of: the particular transaction data 126 that may be provided by the network service 120; or the particular input data 122 that may be sent to request the service generated data 210. Following registration, the contract engine 112 may then begin sending service call(s) 118 to the newly registered network service 120 to request transaction data 126 to populate the aggregate contract data object 116. Accordingly, the contract engine 112 may be described as having a pluggable architecture to facilitate bringing new network service(s) 120 online, and the network service(s) 120 may be described as plug-in(s) to the contract engine 112. Registration of a network service 120 is described further with reference to FIG. 8.

Figure 4:
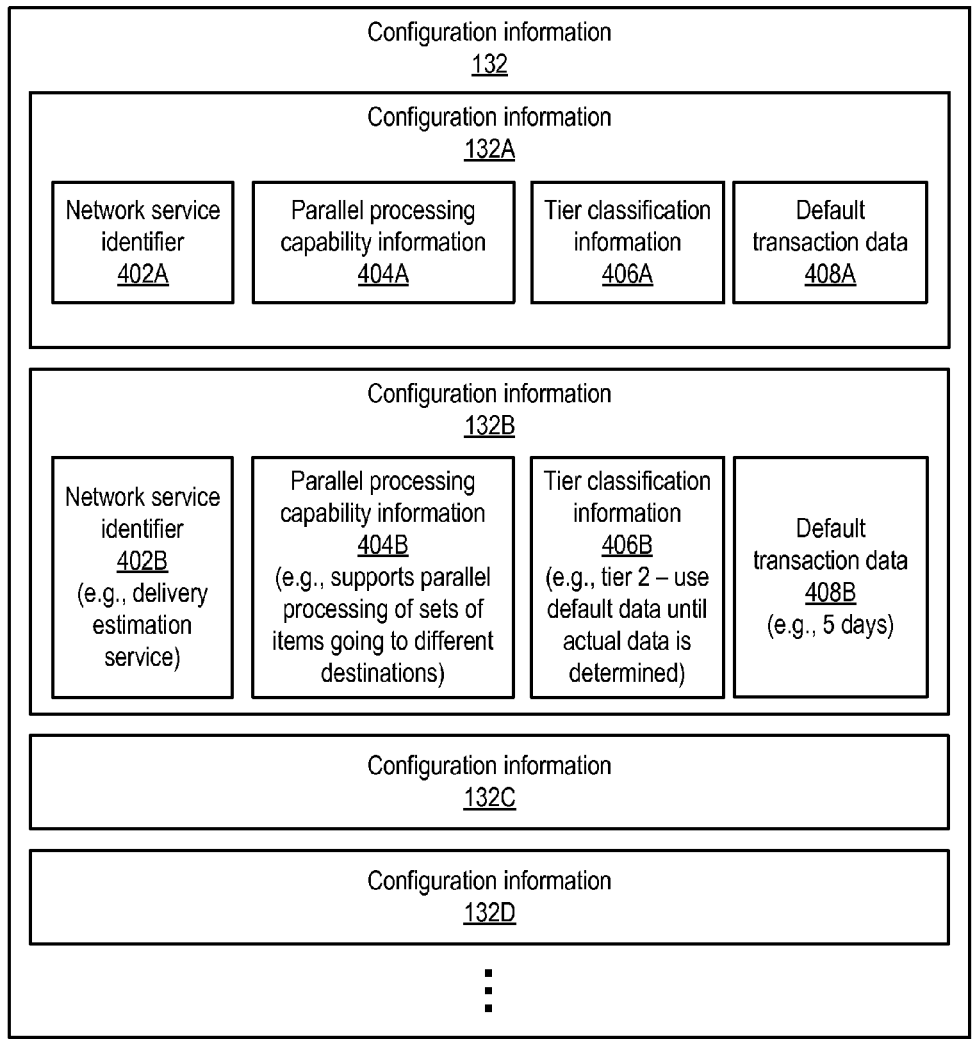
FIG. 4 is a block diagram illustrating an example of configuration information describing characteristics of network services, according to embodiments.

FIG. 4 is a schematic depicting an example of the configuration information 128. In some embodiments, as shown in FIG. 4, the configuration information 132 may include any number of records or portions that each correspond to a network service 120. A portion of configuration information 132A may include a network service identifier (ID) 402A identifying a particular network service 120 that may be employed by the contract engine 112 to generate a particular type of transaction data 126. The portion of configuration information 132A may also describe one or more characteristics of the network service 120. For example, the portion of configuration information 132A may include parallel processing capability information 404A describing a parallel processing capability of the network service 120, such as whether the network service 120 is configured to process, in parallel, multiple items or multiple subsets of items that share a common characteristic (e.g., shipping destination).

The parallel processing capability information 404A may also include grouping criteria for items. The grouping criteria may provide a description of the item that the network service 402 operates on, and the capability of the network service 402 to process a group of such items. For example, the parallel processing capability information 404A may indicate that the network service 402 is capable of processing a subset of items being shipped to a same destination, where the network service 402 calculates an estimated delivery date and/or time. In some cases, the parallel processing capability information 404A may indicate that the network service 402 is capable of processing each item individually. In some embodiments, the determination of subsets of items to send for processing to the multiple instances of a network service 120 may not be random or arbitrary, but instead may be based on semantic information that describes characteristics of the items being grouped together. For example, the items may be grouped based on semantic information describing a delivery destination of the items, as described above. As another example, items may be grouped into subsets of items based on the fulfiller, or fulfillment center, from which the items may be shipped. In such cases, one subset may include items to be shipped from a first fulfiller, and a second subset may include items to be shipped from a second fulfiller. In this way, the parallel processing capability information 404 may correspond to semantic grouping information indicating subsets of items that may be processed by a network service 120.

In some embodiments, the portion of configuration information 132A may include tier classification information 406A describing a tier classification for the network service 120. A network service 120 may be assigned a tier classification that indicates a level of criticality of the network service 120. A higher level of criticality for a network service 120 may indicate that a transaction fails if the network service 120 fails to generate its transaction data 126. A lower level of criticality for a network service 120 may indicate that the transaction does not fail if the network service 120 fails to generate its transaction data 126, or is delayed in generating its transaction data 126. In such cases, default transaction data may be incorporated into the aggregate contract data object 116 (e.g., as a placeholder) pending the availability of the actual transaction data 126 generated by the network service 120. For example, a network service 120 that calculates a total purchase price for the transaction may be assigned a higher level of criticality given that the transaction may not proceed without that particular portion of transaction data 126. A network service 120 that determines an estimated delivery date for items may be assigned a lower level of criticality, such that the transaction does not fail if that portion of transaction data 126 is delayed. The portion of configuration information 132A may include default transaction data 408A that may be incorporated into the aggregate contract data object 116, as a placeholder, if the generation of the actual transaction data 126 is delayed. For example, a network service 120 that estimates the delivery date for item(s) may have default transaction data 408A of "5 days", if it is determined that all or most deliveries may complete within that amount of time. Embodiments support any number of tier classifications for assignment to network services 120. In some embodiments, a network service 120 may be assigned as "tier 1" indicating high criticality, or "tier 2" indicating lower criticality.

FIG. 4 depicts an example configuration information 132B for a particular type of network service 120, e.g., a network service 120 that calculates estimated delivery or shipping dates for item(s). As shown in FIG. 4, the configuration information 132B for such a network service 120 may include parallel processing capability information 404B indicating that the network service 120 supports the parallel processing of different subsets of items going to different destinations. The tier classification information 406B for the network service 120 may indicate that the network service 120 is "tier 2", such that the transaction may not fail if the generated transaction data 126 (e.g., delivery date estimates) is delayed or unavailable. The default transaction data 408B of "5 days" may be employed as a placeholder in the aggregate contract data object 116 until the actual estimated delivery date is generated and provided by the network service 120. Embodiments also support the use of other types of configuration information 132 to describe characteristics of one or more network services 120.

Figure 5:
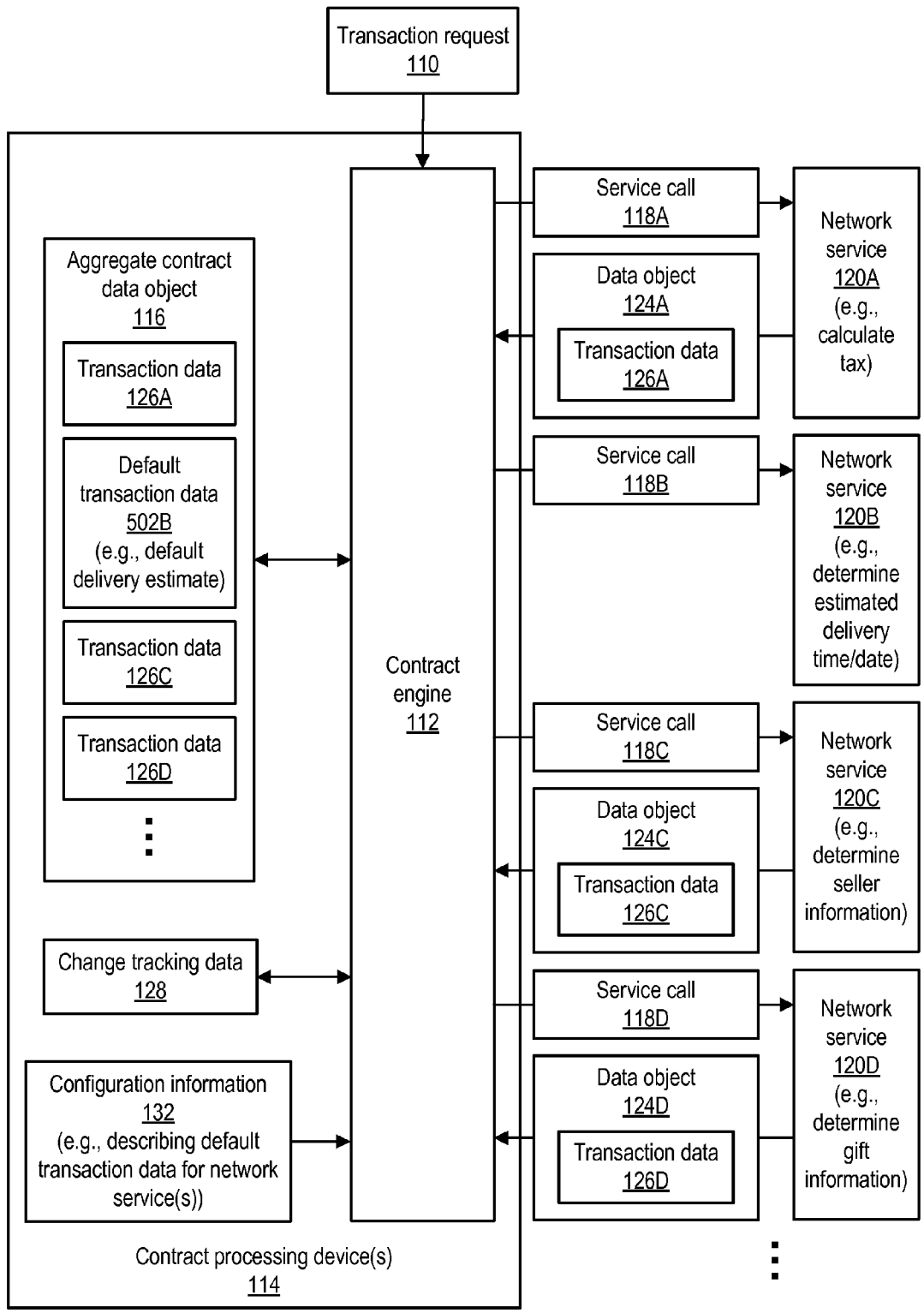
FIG. 5 is a block diagram illustrating an example environment in which a contract engine performs multiple calls to multiple network services to generate different types of transaction data, and in which default transaction data is employed as a placeholder pending generation of actual transaction data, according to embodiments.

FIG. 5 depicts an example environment in which default transaction data 502 may be employed as a placeholder for one or more instances of transaction data 126, in cases where the generation or communication of the actual transaction data 126 is delayed. FIG. 5 depicts a similar example to that shown in FIG. 3, in which the contract engine makes for service calls 118 to four different network services 120 to prompt the generation of four different types of transaction data 126. In the example of FIG. 5, the service calls 118A, 118C, and 118D are successful in that the corresponding network services 120A, 120C, and 120D generate and return the requested transaction data 126A, 126C, and 126D within a predetermined period of time. In this example, the network service 120B (e.g., for delivery date estimation) has not returned transaction data 126 providing a delivery date estimation. Accordingly, the contract engine 112 may determine the default transaction data 502B based on the configuration information 132, and incorporate the default transaction data 502B (e.g., "5 days") into the aggregate contract data object 116 in place of actual transaction data 126B, e.g., the actual estimated delivery date that would be generated by a successful operation of the network service 120B. Later, if the network service 120B provides the actual transaction data 126B, e.g., the actual estimated delivery date, the contract engine 112 may replace the default transaction data 502B with the actual transaction data 126B in the aggregate contract data object 116.

Figure 6:
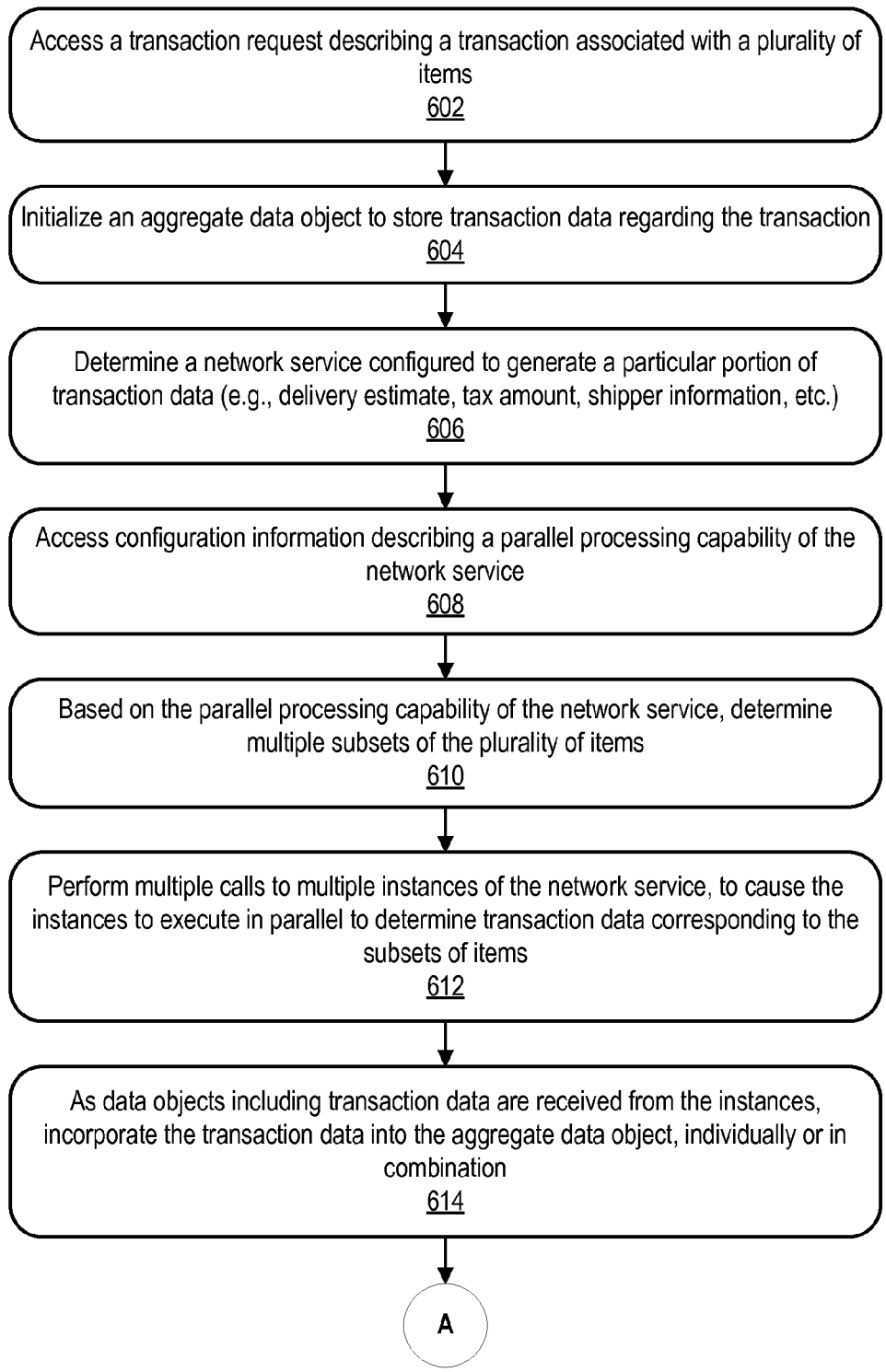
FIG. 6 is a flow diagram illustrating one or more embodiments of a process for performing parallel calls to multiple instances of a network service to generate transaction data.
Figure 7:
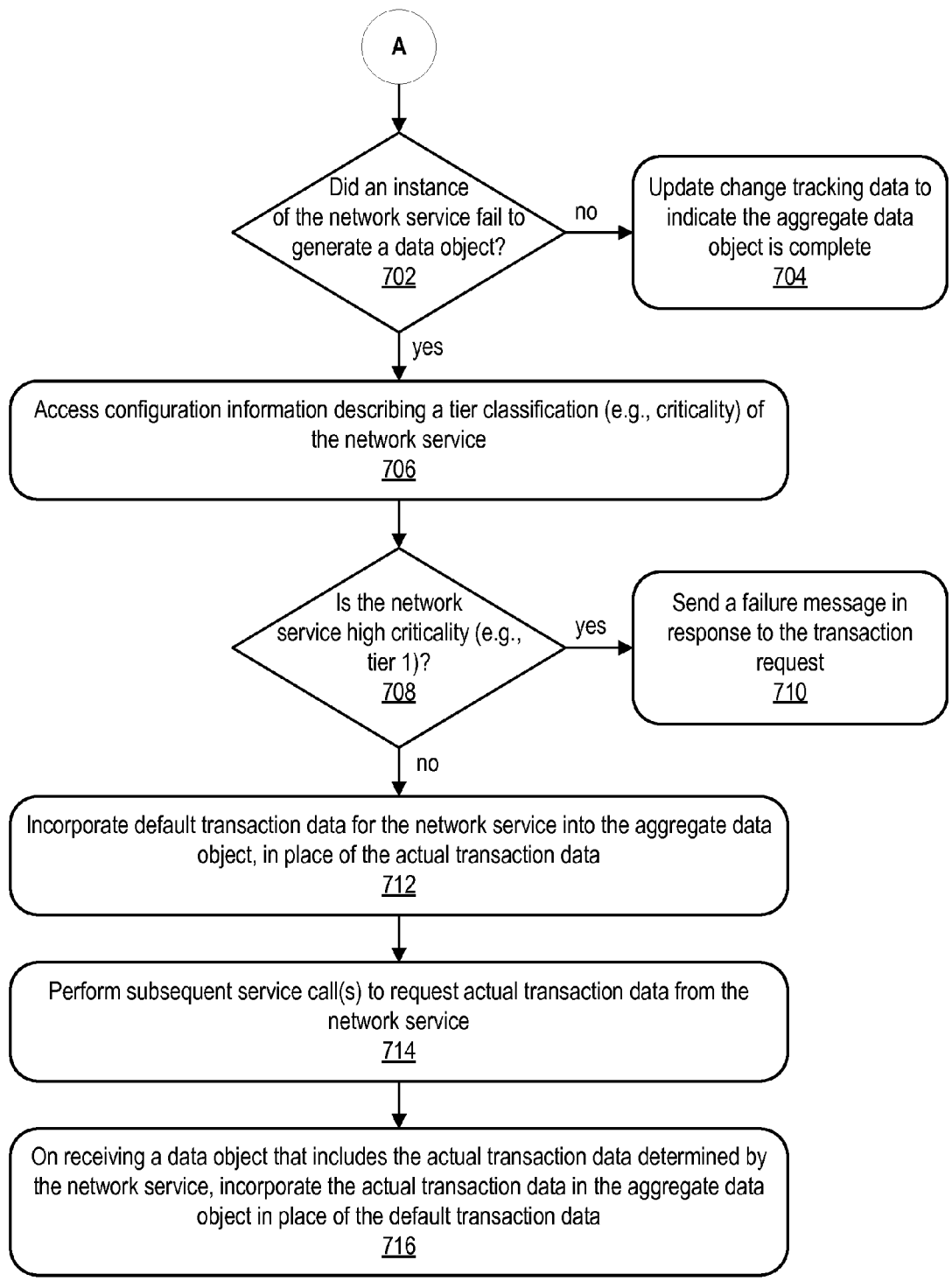
FIG. 7 is a flow diagram illustrating one or more embodiments of a process for performing parallel calls to multiple instances of a network service to generate transaction data.

FIGS. 6 and 7 are flow diagrams illustrating one or more embodiments of a process for performing parallel service calls 118 to multiple instances of a network service 120 to generate multiple instances or portions of transaction data 126. Operations of the process may be performed by one or more of the e-commerce application 108, the client process 106, the contract engine 112, the network service(s) 120, or other software modules executing on one or more of the end-user device(s) 102, the front end server device(s) 104, the contract processing device(s) 114, or other computing device(s).

At 602, a transaction request 110 may be received or otherwise accessed. As described above, the transaction request 110 may describe a transaction (e.g., a purchase transaction) associated with a plurality of items.

At 604, an aggregate data object (e.g., the aggregate contract data object 116) may be initialized or otherwise created to store the transaction data 126 that is to be generated regarding the transaction.

At 606, a network service 120 may be determined, the network service 120 configured to generate a particular portion of the transaction data 126 for the transaction, such as a delivery date estimate, shipper information, tax amount, gift information, and so forth.

At 608, the configuration information 132 may be accessed. As described above, the configuration information 132 may describe a parallel processing capability of the network service 120 determined at 606.

At 610, based at least partly on the configuration information 132 for the network service 120, multiple subsets of items may be determined that are suitable for parallel processing by multiple instances of the network service 120. A subset of items, or a set of items, may include a single item or multiple items.

At 612, multiple service calls 118 may be made to multiple instances of the network service 120, to cause the multiple instances of the network service 120 to execute in parallel to determine multiple instances of the transaction 126 corresponding to the multiple subsets of items. The multiple instances of the network service 120 may generate and send multiple data objects 124 to communicate the multiple portions of transaction data 126 to the contract engine 112.

At 614, as the data objects 124 are received by the contract engine 112, the contract engine 112 may incorporate the transaction data 126 carried in each of the received data objects 124 into the aggregate data object. In some cases, the various portions of transaction data 126 received may be incorporated into the aggregate data object. In some cases, as illustrated in FIG. 2, the portions of transaction data 126 may be combined or otherwise processed by the contract engine 112 prior to incorporating combined transaction data 204 into the aggregate data object. The process may continue as described with reference to FIG. 7.

At 702, a determination may be made whether at least one instance of the network service 120 failed to generate and send its portion of the transaction data 126, e.g., within a predetermined time period. If not, the process may proceed to 704 and update the change tracking data 128 to indicate that the aggregate data object is complete, at least with respect to the transaction data 126 generated by the multiple instances of the network service 120. If it is determined that at least one instance of the network service 120 failed to provide its portion of the transaction data 126, the process may proceed to 706.

At 706, the configuration information 132 may be accessed, the configuration information 132 describing a tier classification of the network service 120. As described above, the tier classification may indicate a level of criticality of the network service 120.

At 708, a determination is made whether the network service 120 has been assigned a high level of criticality (e.g., "tier 1"), based on the configuration information 132. If so, the process may proceed to 710 and send a failure message in response to the transaction request 110. The failure message may indicate, to the client process 106, that the transaction has failed. The client process 106 may then provide a notification to an end-user, via the e-commerce application 108, that the transaction has failed. In some cases, the client process 106 may subsequently send another transaction request 110 to prompt the contract engine 112 to retry processing the transaction. If the network service 120 has not been assigned a high level of criticality, the process may proceed to 712.

At 712, the default transaction data 502 for the network service 120 may be incorporated into the aggregate data object, in place of the actual transaction data 126 that may otherwise be generated by a successful operation of the network service 120.

At 714, in some embodiments the contract engine 112 may make one or more subsequent service calls 118 to request the actual (e.g., calculated) transaction data 126 from the network service 120, or from multiple instances of the network service 120. In some embodiments, the subsequent service call(s) 118 may be triggered by additional request(s) 130 from the client process 106 for the transaction data 126. In some embodiments, the subsequent service call(s) 118 may be triggered by another service, such as a workflow management service, that prompts the contract engine 112 to send the subsequent service call(s) 118 if the actual transaction data 126 has not yet been received and incorporated into the aggregate contract data object 116.

At 716, in cases where the actual transaction data 126 is eventually received from the instance of the network service 120, the actual transaction data 126 may be incorporated into the aggregate data object in place of the default transaction data 502. In some embodiments, if the instance of the network service 120 fails to provide the actual transaction data 126 within a predetermined period of time, the contract engine 112 may send another service call 116 to another instance of the network service 120 to request the transaction data 126. Alternatively, the transaction may fail.

Figure 8:
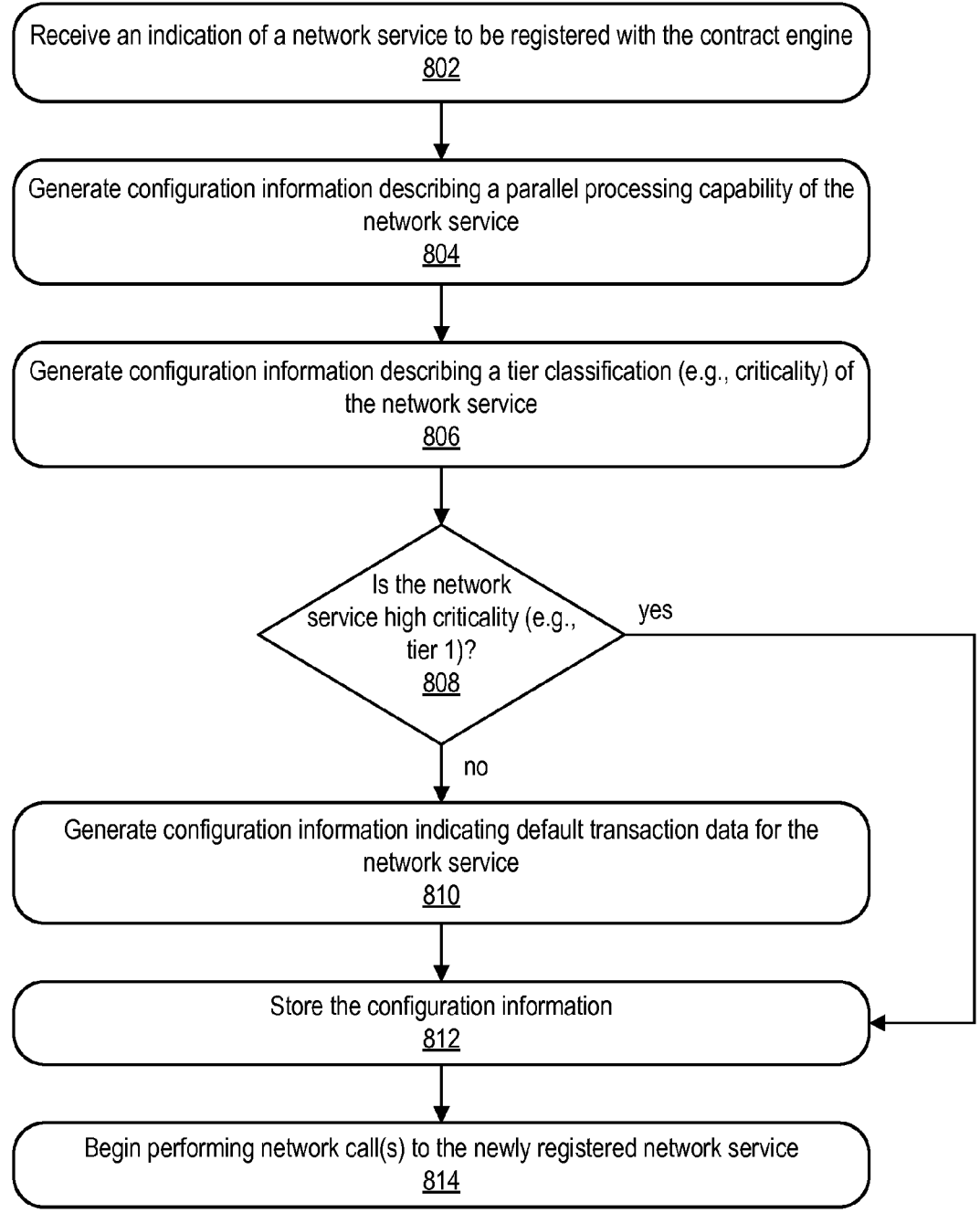
FIG. 8 is a flow diagram illustrating one or more embodiments of a process for determining configuration information describing a network service.

FIG. 8 is a flow diagram illustrating one or more embodiments of a process for determining the configuration information 132 describing a network service 120, during registration of the network service 120. Operations of the process may be performed by one or more of the e-commerce application 108, the client process 106, the contract engine 112, the network service(s) 120, or other software modules executing on one or more of the end-user device(s) 102, the front end server device(s) 104, the contract processing device(s) 114, or other computing device(s).

At 802, an indication is received of a network service 120 to be registered for use by the contract engine 112.

At 804, configuration information 132 may be generated describing a parallel processing capability of the network service 120.

At 806, configuration information 132 may be generated describing a tier classification (e.g., level of criticality) of the network service 120.

At 808, a determination may be made whether the network service 120 is assigned a high criticality level. If not, the process may proceed to 810 and generate configuration information 132 describing default transaction data 502 for the network service 120. The process may then proceed to 812. If the network service 120 is assigned a high criticality level, the process may proceed to 812.

At 812, the configuration information 132 may be stored such that it is accessible by the contract engine 112. At 814, the contract engine 112 may begin making network call(s) 116 to the newly registered service 120. In some embodiments, other information regarding the network service 120 may be collected during registration and stored in the configuration information 132 for the network service 120. Such other information may include one or more of the following: the filtering information as described above; information regarding support for using cached transaction data 126, as described above; a maximum number of items that the network service 120 is able to process in response to a single service call 116; a minimum number of items per service call 116; or a maximum number of instances of the network service 120 that may be instantiated for a particular transaction.

Figure 9:
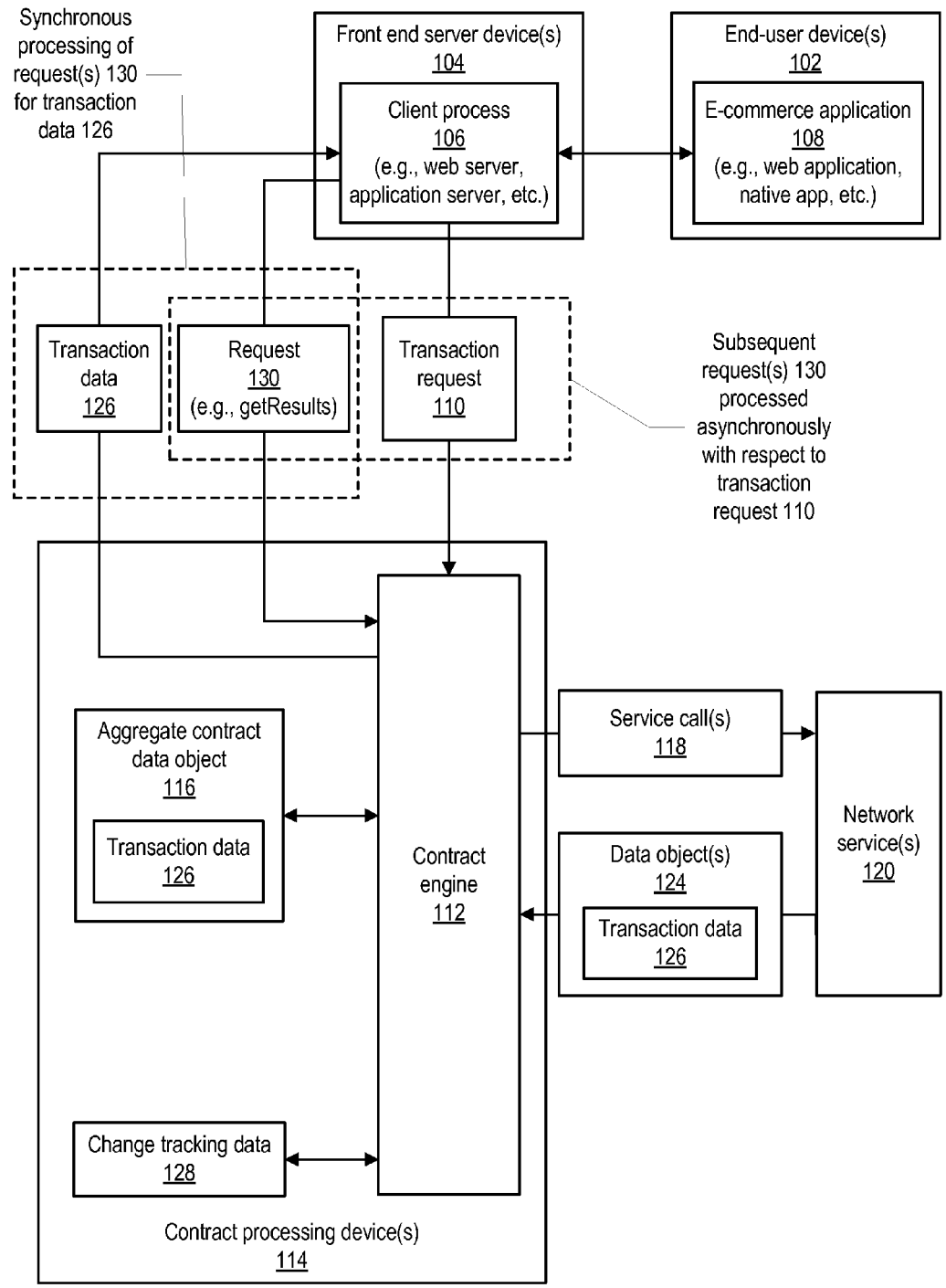
FIG. 9 is a block diagram illustrating an example environment in which a client process receives transaction data asynchronously with respect to sending a transaction request that caused the generation of the transaction data.

FIG. 9 is a block diagram illustrating an example environment in which a client process 106 receives transaction data 126 asynchronously with respect to sending a transaction request 110 that caused the generation of the transaction data 126. FIG. 9 depicts embodiments that employ a first mechanism for asynchronous communication of transaction data 126 to a client process 106, as described above. As described above, a client process 106 may communicate a transaction request 110 to the contract engine 112 executing on the contract processing device(s) 114. The contract engine 112 may perform any number of service calls 118 to network service(s) 120 to cause the network service(s) 120 to generate transaction data 126. On receiving the data object(s) 124 that communicate the transaction data 126 from the network service(s) 120, the contract engine 112 may incorporate the transaction data 126 in the aggregate contract data object 116.

At some time after sending the initial transaction request 110, the client process 106 may send one or more requests 130 to request particular portion(s) of the transaction data 126 stored in the aggregate contract data object 116. In some embodiments, the request(s) 130 may be made via an API exposed by the contract engine 112. For example, the contract engine API may provide a callable method getResults. The getResults method may take, as an input parameter, an identification of the particular portion of transaction data 126 requested (e.g., total price, delivery date estimate, shipper information, gift message, etc.). The getResults method may retrieve the requested transaction data 126 from the aggregate contract data object 116 and send the requested transaction data 126 to the client process 106 as a return value or return object. In some embodiments, the client process 106 may receive a transaction ID in response to the transaction request 110, the transaction ID (e.g., uniquely) identifying the transaction. The client process 106 may then include the transaction ID as a parameter in the subsequent request(s) 130, e.g., the getResults calls, to indicate the particular transaction for which transaction data 126 is requested.

In some embodiments, the processing of the request 130 (e.g., getResults) may be synchronous, such that the communication of the requested portion of transaction data 126 is synchronous with respect to the request 130. If the requested portion of transaction data 126 has not been incorporated into the aggregate contract data object 116, the getResults call may block and return the portion of transaction data 126 when it is present in the aggregate contract data object 116. In some embodiments, the getResults call may return an error code as a return value if the requested portion of transaction data 126 does not become available in the aggregate contract data object 116 within a predetermined (e.g., timeout) period of time. In such cases, the client process 106 may make another getResults call to request the portion of transaction data 126. The sending of the request 130, and its processing, may be described as asynchronous with respect to the initial transaction request 110, given that the timing of the sending or processing of the request 130 may be independent of when the transaction request 110 was sent, apart from the request 130 being sent after the transaction request 110.

In some cases, the aggregate contract data object 116 may include default transaction data 502 as a placeholder pending generation of the actual transaction data 126. In such cases, the default transaction data 502 may be returned to the client process 106 with an indication that it is default, placeholder data. The client process 106 may then present the default transaction data 502 in the e-commerce application 108 with an indication that the data represents an estimate or a placeholder. For example, the default delivery estimate of "5 days" may be presented, in the e-commerce application 108, with some visual indication that the delivery date is an estimate that may be updated later with a more accurate estimate.

Figure 10:
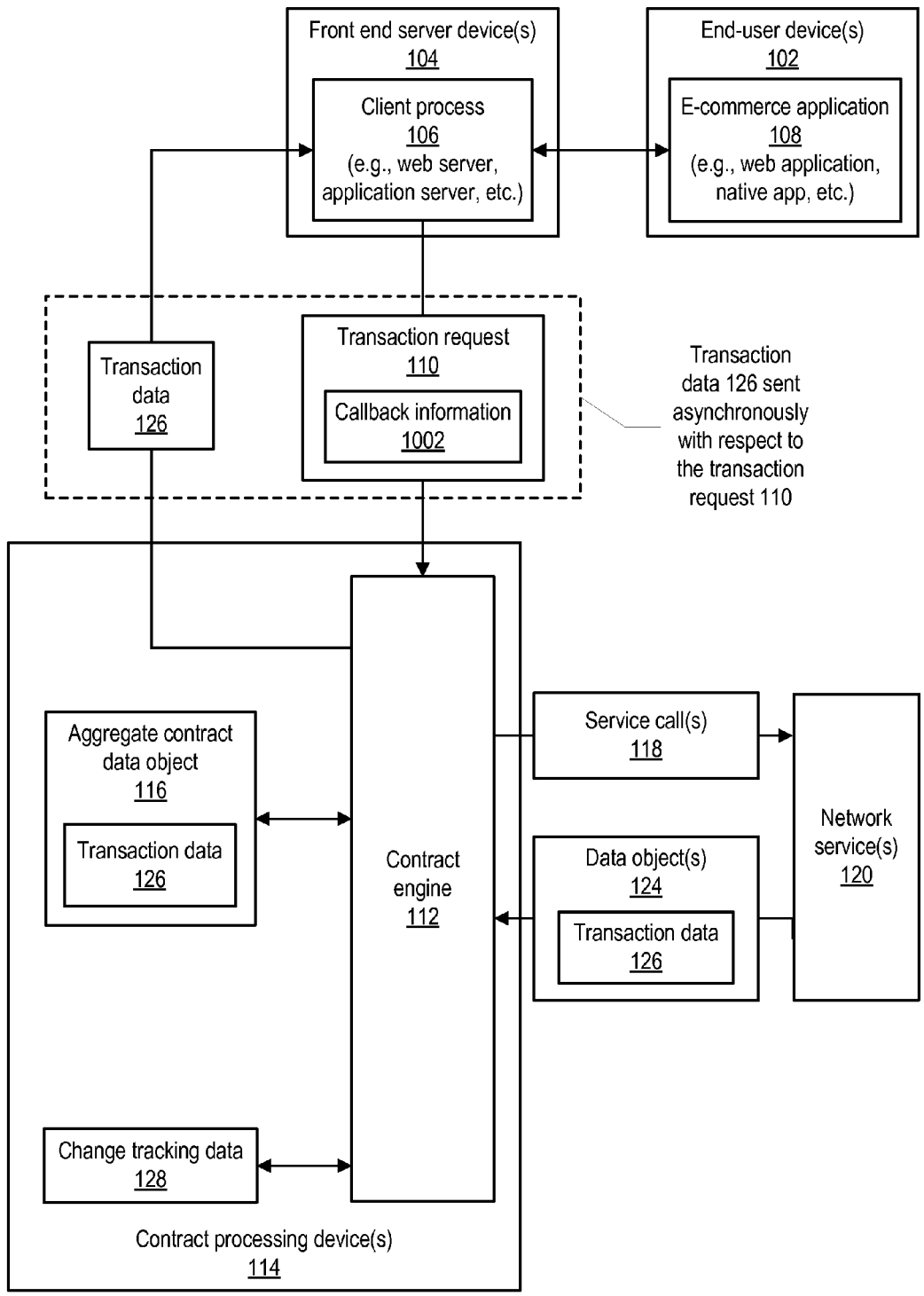
FIG. 10 is a block diagram illustrating an example environment in which a client process receives transaction data asynchronously with respect to sending a transaction request, the transaction data being sent to a network location specified in callback information provided by the client process.

FIG. 10 is a block diagram illustrating an example environment in which a client process 1006 receives transaction data 126 asynchronously with respect to sending a transaction request 110, the transaction data 126 being sent to a network location specified in callback information 1002 provided by the client process 106. FIG. 10 depicts embodiments that employ a second mechanism for asynchronous communication of transaction data 126 to a client process 106, as described above. As described above, a client process 106 may communicate a transaction request 110 to the contract engine 112 executing on the contract processing device(s) 114. The contract engine 112 may perform any number of service calls 118 to network service(s) 120 to cause the network service(s) 120 to generate transaction data 126. On receiving the data object(s) 124 that communicate the transaction data 126 from the network service(s) 120, the contract engine 112 may incorporate the transaction data 126 in the aggregate contract data object 116.

In embodiments that employ the second mechanism for asynchronous communication of transaction data 126, the client process 106 may send callback information 1002. The callback information 1002 may be sent as part of the transaction request 110, or may be provided in a separate communication from the transaction request 110. The callback information 1002 may indicate a network location where the contract engine 112 may send the transaction data 126 to the client process 106. For example, the callback information 1002 may include one or more of a network address (e.g., IP address), URI, URL, URN, port number, or other network information. In some cases, the callback information 1002 may identify the network location of a load balancer, gateway, VIP, or other component configured to mediate communications to multiple client processes 106. In such cases, the callback information 1002 may also include information that identifies the particular client process 106 that generated the transaction request 110.

On determining that at least a portion of the transaction data 126 for the transaction has been generated and incorporated into the aggregate contract data object 116, the contract engine 112 may send at least the portion of the transaction data 126 to the client process 106 at the network location specified in the callback information 1002. In some embodiments, the entire set of transaction data 126 may be sent to the client process 106 once it is stored in the aggregate contract data object 116. Alternatively, portions of the transaction data 126 may be sent to the client process 106 as the portions become available in the aggregate contract data object 116. The sending of the transaction data 126, or a portion thereof, may be described as asynchronous with respect to the receipt and processing of the transaction request 110.

In both the first mechanism (as described with reference to FIGS. 9 and 11) and the second mechanism (as described with reference to FIGS. 10 and 12), the transaction data 126 may be provided to the client process 106 in a manner that is asynchronous relative to the handling of the initial transaction request 110 that prompted the generation of the transaction data 126. As described herein, the first mechanism communicates the transaction data 126 in a synchronous response to the request(s) 130, and the second mechanism communicates the transaction data 126 asynchronously to the network location specified in the callback information. Accordingly, the second mechanism may be described as fully asynchronous in comparison to the first mechanism which may be described as partially asynchronous.

Figure 11:
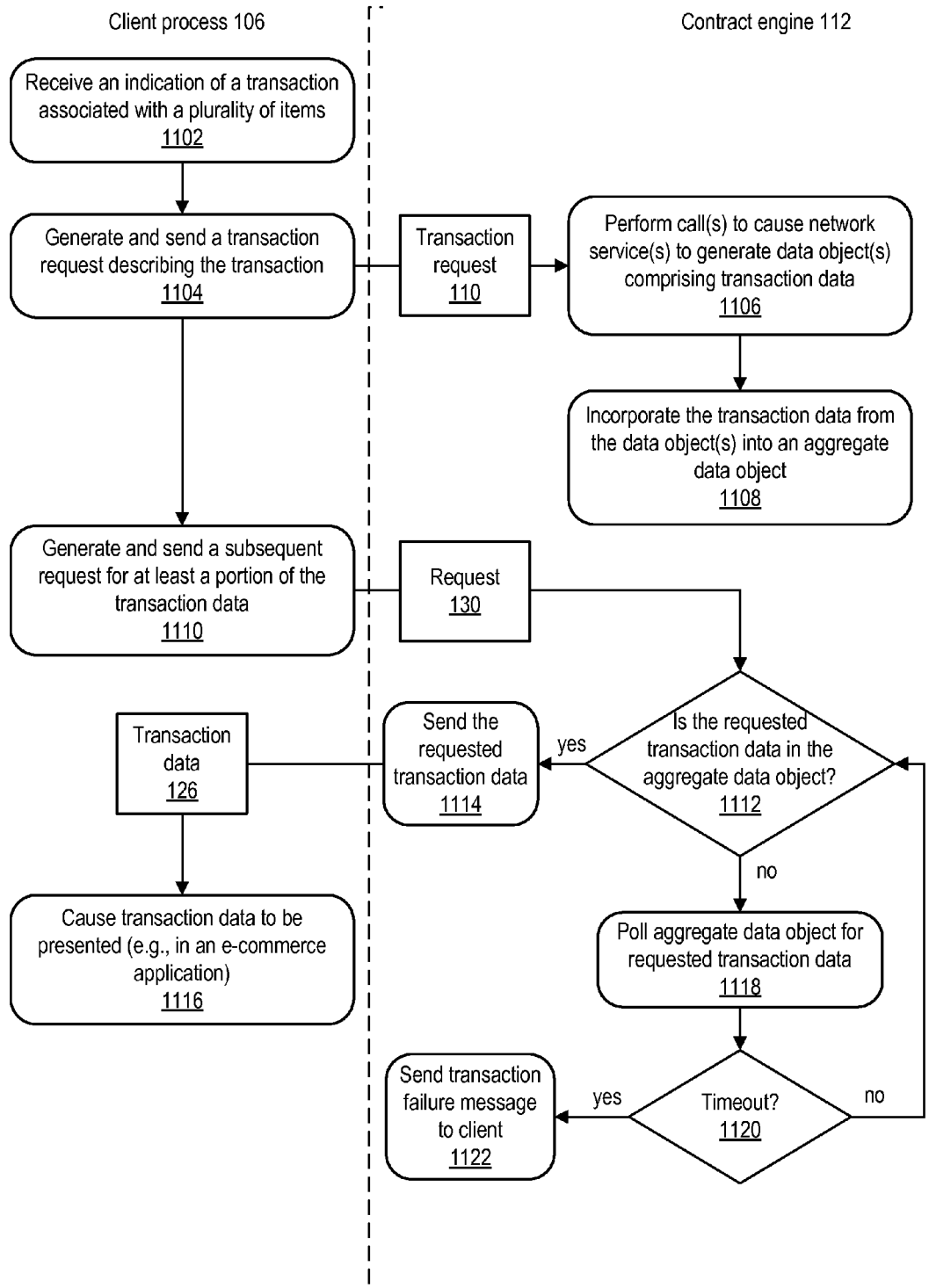
FIG. 11 is a flow diagram illustrating one or more embodiments of a process for communicating transaction data to a client process asynchronously with respect to the processing of the transaction request that caused the generation of the transaction data.

FIG. 11 is a flow diagram illustrating one or more embodiments of a process for communicating the transaction data 126 to a client process 106 asynchronously with respect to the processing of the transaction request 110 that caused the generation of the transaction data 126. Operations of the process may be performed by one or more of the e-commerce application 108, the client process 106, the contract engine 112, the network service(s) 120, or other software modules executing on one or more of the end-user device(s) 102, the front end server device(s) 104, the contract processing device(s) 114, or other computing device(s). FIG. 11 describes the first mechanism for asynchronously communicating the transaction data 126 to the client process 106, as described with reference to FIG. 9.

At 1102, a client process 106 may receive an indication of a transaction associated with a plurality of items. The indication may be received from an e-commerce application 108, or other application provided by the client process 106.

At 1104, the client process 106 may generate and send the transaction request 110 describing the transaction.

At 1106, the contract engine 112 may access the transaction request 110 and perform one or more service calls 116 to cause network service(s) 120 to generate the data object(s) 124 comprising the transaction data 126 for the transaction, as described above. At 1108, the transaction data 126 may be incorporated into the aggregate data object as the transaction data 126 is generated and made available.

At 1110, subsequent to sending the transaction request 110, and asynchronously with respect to the transaction request 110, the client process 106 may send a subsequent request 130 (e.g., make a getResults call) for at least a portion of the transaction data 126.

At 1112, the contract engine 112 may access the request 130 and determine whether the requested transaction data 126 is currently available in the aggregate data object. If the requested transaction data 126 is available, the contract engine 112 may send it to the client process 106 at 1114. At 1116, the client process 106 may cause the received portion of transaction data 126 to be presented, such as in the e-commerce application 108. Alternatively, the client process 106 may generate additional information based on the received transaction data 126, and cause the additional information to be presented via the e-commerce application 108 or other UI.

If it is determined at 1112 that the requested transaction data 126 is not yet available in the aggregate data object, the process may proceed to 1118. At 1118, the contract engine 112 may begin polling the aggregate data object to detect when the requested transaction data 126 is present in the aggregate data object. At each polling interval, a determination may be made at 1120 whether a predetermined timeout period of time has elapsed since receiving the request 130. If so, the process may proceed to 1122 and send a transaction failure message to the client process 106 as described above. If the timeout period has not elapsed, the process may return to 1112 and check whether the requested portion of transaction data 126 has become available. In some embodiments, the frequency of polling the aggregate data object may depend on the size of the transaction (e.g., number of items), the size of the particular requested portion of transaction data 126, or other factors. For example, a less frequent polling period may be employed in cases where the size of the transaction or the size of the requested portion of transaction data 126 is large. In some embodiments, the timeout period may be specified by the client process 106. For example, the client process 106 may indicate that the requested transaction data 126 is to be delivered within a specified period of time (e.g., in the next minute). The client process 106 may indicate the timeout period in the request 130. In cases where the client process 106 does not specify a timeout period, a default timeout period (e.g., 35 seconds) may be used.

Figure 12:
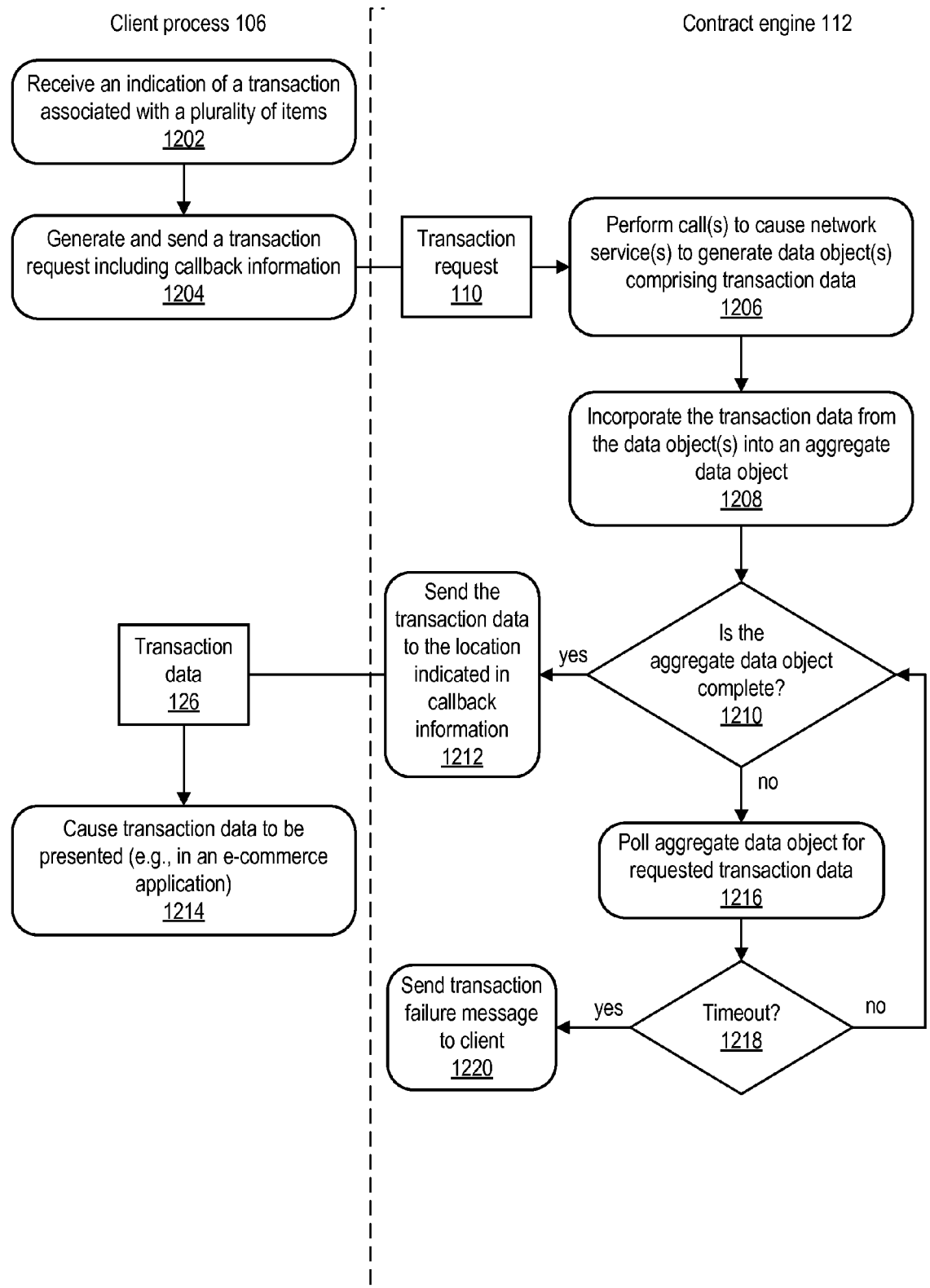
FIG. 12 is a flow diagram illustrating one or more embodiments of a process for communicating transaction data to a client process asynchronously with respect to the processing of the transaction request, using callback information provided by the client process.

FIG. 12 is a flow diagram illustrating one or more embodiments of a process for communicating the transaction data 126 to a client process 106 asynchronously with respect to the processing of the transaction request 110, using the callback information 1002 provided by the client process 106. Operations of the process may be performed by one or more of the e-commerce application 108, the client process 106, the contract engine 112, the network service(s) 120, or other software modules executing on one or more of the end-user device(s) 102, the front end server device(s) 104, the contract processing device(s) 114, or other computing device(s). FIG. 12 describes the second mechanism for asynchronously communicating the transaction data 126 to the client process 106, as described with reference to FIG. 10.

At 1202, a client process 106 may receive an indication of a transaction associated with a plurality of items. The indication may be received from an e-commerce application 108, or other application provided by the client process 106.

At 1204, the client process 106 may generate and send the transaction request 110 describing the transaction. As described above, the transaction request 110 may include the callback information 1002.

At 1206, the contract engine 112 may access the transaction request 110 and perform one or more service calls 116 to cause network service(s) 120 to generate the data object(s) 124 comprising the transaction data 126 for the transaction, as described above. At 1208, the transaction data 126 may be incorporated into the aggregate data object as the transaction data 126 is generated and made available.

At 1210, the contract engine 112 may determine whether the aggregate data object is complete, e.g., whether a complete set of transaction data 126 has been generated and stored for the transaction. In some embodiments, the change tracking data 128 may be checked to determine whether one or more network services 120 have not yet generated transaction data 126 to be incorporated into the aggregate data object. If the aggregate data object is complete, the process may proceed to 1212 and send the transaction data 126, or a portion of the transaction data 126, to the network location indicated by the callback information 1002. The client process 106 may receive the transaction data 126 at 1214, and cause the transaction data 126 to be presented via the e-commerce application 108 or other UI.

If it is determined that the aggregate data object for the transaction is not complete, the process may proceed to 1216 and begin polling the aggregate data object for the transaction data 126 as describe above. At each polling interval, a determination may be made at 1218 whether a predetermined timeout period of time has elapsed since receiving the transaction request 110. If so, the process may proceed to 1220 and send a transaction failure message to the client process 106 as described above. If the timeout period has not elapsed, the process may return to 1210 and check whether the transaction data 126 has become available. In some embodiments, the frequency of polling the aggregate data object may depend on the size of the transaction, as described above.

Figure 13:
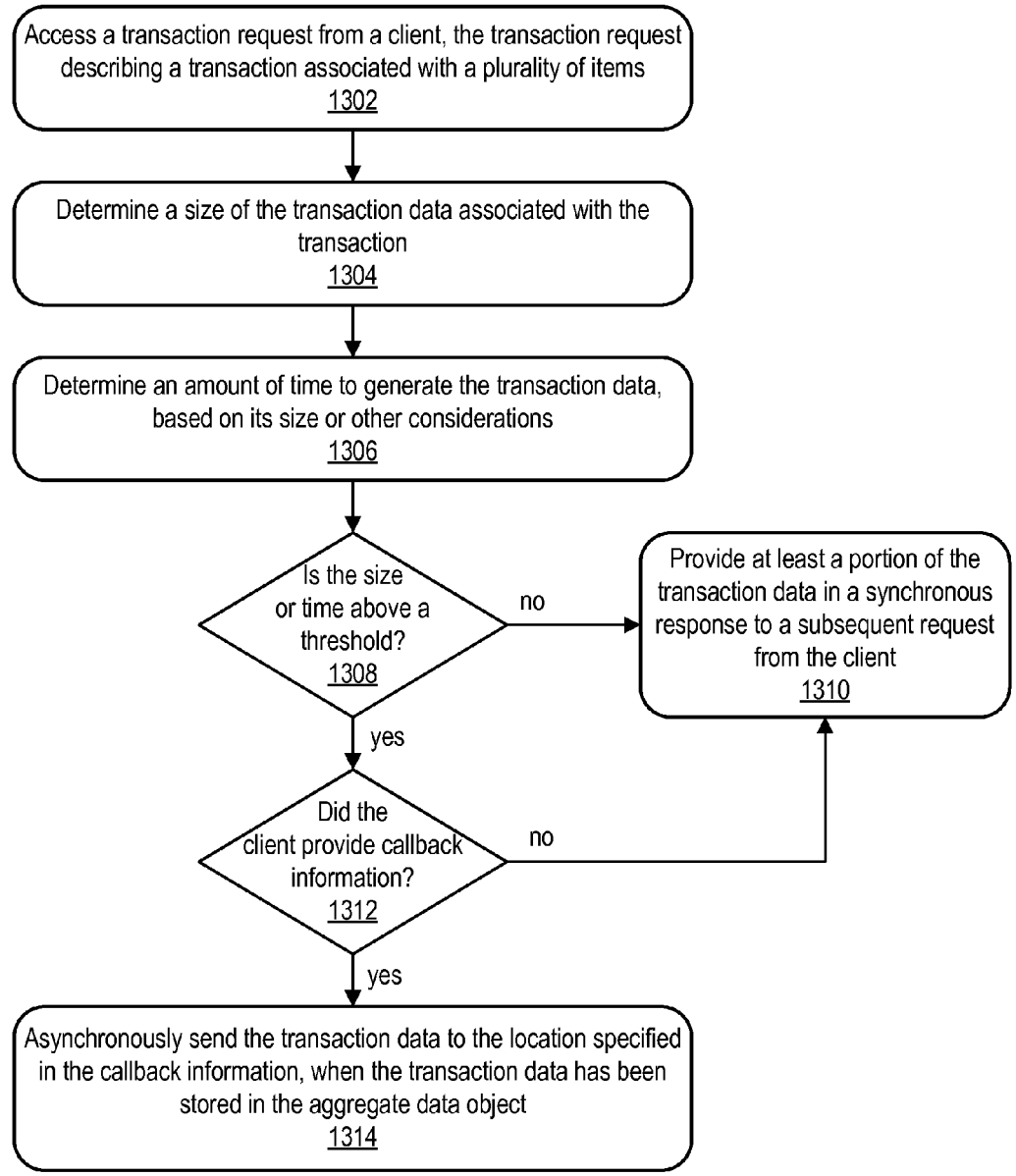
FIG. 13 is a flow diagram illustrating one or more embodiments of a process for determining, based at least partly on a size of transaction data, a method for communicating the transaction data to a client process asynchronously with respect to the processing of the transaction request.

FIG. 13 is a flow diagram illustrating one or more embodiments of a process for determining, based at least partly on a size of transaction data, a method for communicating the transaction data to a client process asynchronously with respect to the processing of the transaction request. Operations of the process may be performed by one or more of the e-commerce application 108, the client process 106, the contract engine 112, the network service(s) 120, or other software modules executing on one or more of the end-user device(s) 102, the front end server device(s) 104, the contract processing device(s) 114, or other computing device(s). FIG. 13 describes embodiments in which the contract engine 112 or other module determines whether to use the first mechanism for asynchronous communication of transaction data 126 (as described with reference to FIGS. 9 and 11) or the second mechanism (as described with reference to FIGS. 10 and 12). Such a determination may be made based on various criteria.

At 1302, a transaction request 110 may be accessed. As described above, the transaction request 110 may be sent from a client process 106 and may indicate a plurality of items for purchase or other processing.

At 1304, a size of the transaction data 126 for the transaction may be estimated or otherwise determined. In some cases, the size of the transaction data 126 may be estimated based on a number of items specified (e.g., for purchase) in the transaction request 110.

At 1306, in some embodiments a determination may be made of an amount of time that may be needed to generate the transaction data 126 through service call(s) 116 to one or more network services 120. Such a determination may be made based on a size of the transaction, such as a number of items specified.

At 1308, a determination is made whether one or more of the size or time determined at 1304 or 1306 is above a predetermined threshold. If not, e.g., for smaller transactions, embodiments may opt to employ the first mechanism described above. At 1310, one or more portions of the transaction data 126 may be provided in a synchronous response to subsequent request(s) 130 (e.g., getResults calls) from the client process 106.

If one or both of the size or time estimate is above a threshold, the process may proceed to 1312. At 1312, a determination is made whether the client process 106 has provided the callback information 1002 indicating a network location where transaction data 126 may be sent. If not, the process may proceed to 1310 and employ the first mechanism. If so, the process may proceed to 1314 and employ the second mechanism, including asynchronously sending the transaction data 126 (or a portion thereof) to the network location specified in the callback information 1002 when the transaction data 126 is available in the aggregate data object. Accordingly, some embodiments may opt to employ the second mechanism in cases where the transaction is large (e.g., with many items) and the client process 106 has provided the callback information 1002. In some cases, the contract engine 112 may indicate that the client process 106 use either the first mechanism or the second mechanism based on the size of the transaction (e.g., the number of items) indicated in the transaction request 110. In such cases, for large transactions the contract engine 112 may indicate that the client process 106 is to use the second mechanism, and may prompt the client process 106 to send the callback information 1002 to be used for asynchronously communicating the transaction data 126 to the client process 106.

Figure 14:
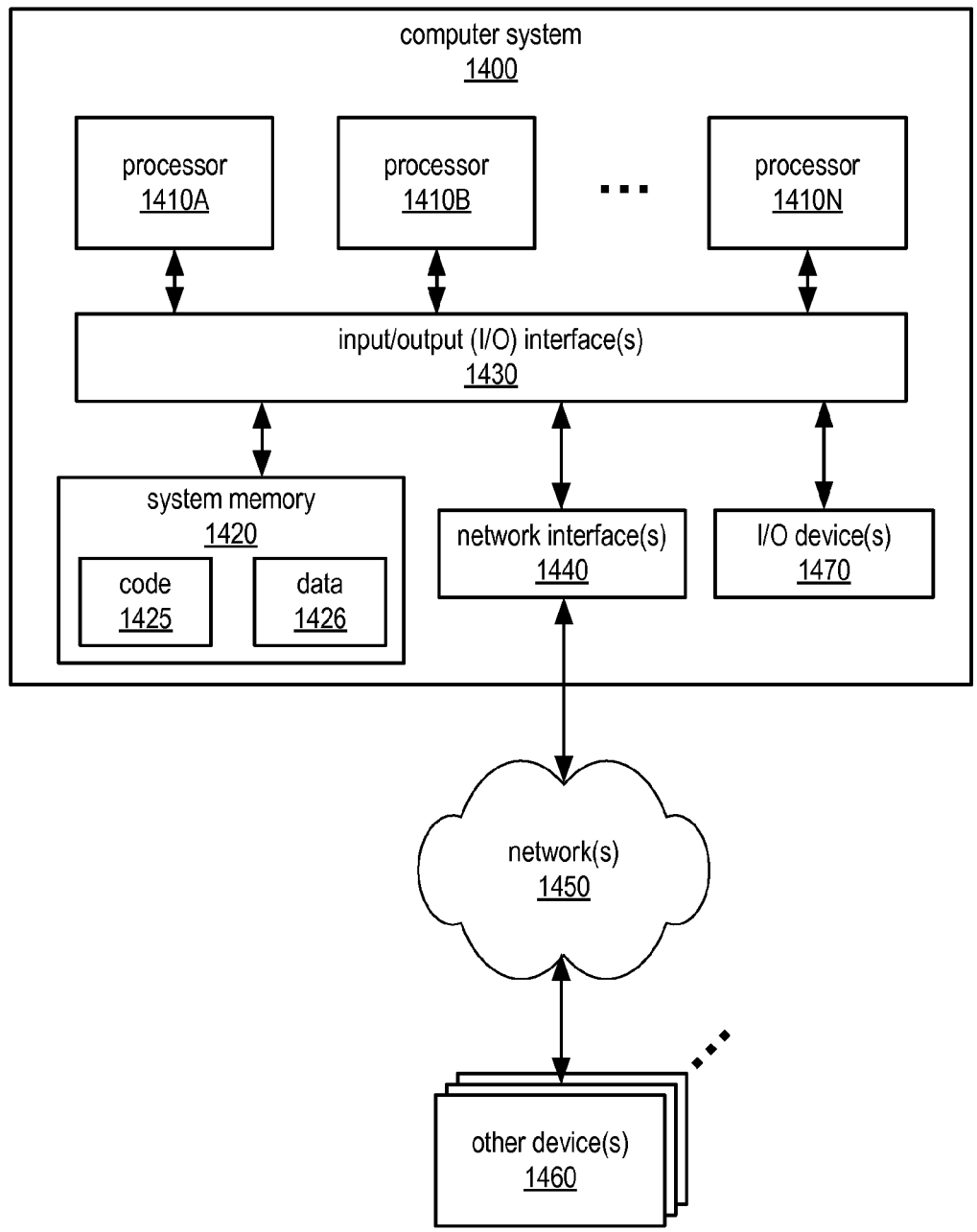
FIG. 14 is a block diagram illustrating a computer system configured to implement one or more embodiments.

FIG. 14 is a block diagram illustrating a computer system 1400 configured to implement at least a portion of the queue-based communication described herein according to various embodiments. The computer system 1400 may include any number of computing devices, and may execute or otherwise include any number of software modules such as applications, processes, libraries, interfaces, application programming interfaces (APIs), and so forth. For example, computer system 1400 may be configured to implement one or more of the contract processing device(s) 114, the end-user device(s) 102, the front end server device(s) 104, and so forth. The computer system 1400 may include any type of computing device including but not limited to: a personal computer system, a desktop computer, a rack-mounted computing device, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 1400 may include one or more physical computing devices. The computing system 1400 may also include one or more of a virtual computing environment, a hypervisor, an emulation, or a virtual machine executing on one or more physical computing devices. In some embodiments, the computing system 1400 may comprise a cluster, cloud, farm, or other grouping of multiple devices that coordinate operations to provide load balancing, failover support, parallel processing capabilities, shared storage resources, or other aspects.

Computer system 1400 may include one or more processors 1410 coupled to a system memory 1420 via one or more input/output (I/O) interfaces 1430. One or more of the processor(s) 1410 may include a single core or multiple cores, which may be configured to execute single-threaded or multi-threaded code. In various embodiments, computer system 1400 may be a uniprocessor system including one processor 1410, or a multiprocessor system including multiple processors 1410 (e.g., two, four, eight, or any other number). The processor(s) 1410 may include any processor(s) capable of executing instructions. For example, in various embodiments, the processor(s) 1410 may include general-purpose or embedded processor(s) implementing any of a variety of instruction set architectures (ISAs), such as the x86, PowerPC, SPARC, or MIPS ISAs, or any other ISA. In multiprocessor systems, each of processors 1410 may implement the same ISA. Alternatively, different ones of the processors 1410 may implement different ISAs.

The computer system 1400 may include one or more system memories 1420, described herein as system memory 1420, configured to store one or more of code 1425 or data 1426 such that the code 1425 and the data 1426 are accessible by the processor(s) 1410. The system memory 1420 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 1420 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 1420 may be incorporated into the computer system 1400. In some cases, at least a portion of the system memory 1420 may be external to the computer system 1400 and accessible via the network interface(s) 1440 or the I/O device(s) 1470.

The system memory 1420 may include the code 1425. The code 1425 may include executable instructions that are executable by processor(s) 1410 to implement the embodiments described herein. The code 1425 may implement one or more executable software modules, such as applications, programs, processes, libraries, interfaces, APIs, scripts, routines, and so forth. The code 1425 may be in a compressed or uncompressed form. The code 1425 may be in an encrypted or unencrypted form. The code 1425 may include any number of instructions that may be employed to program a computing device, or other electronic device, to perform the operations described herein. The code 1425 may be arranged in any format and according to any language. In some embodiments, the code 1425 may include machine-executable binary instructions that are configured to execute on the processor(s) 1410, the instructions generated by compiling, linking, or otherwise processing source code written in any programming language. In some embodiments, the code 1425 may include intermediate language instructions (e.g., bytecodes) that execute within a runtime application such as a Java™ Virtual Machine (JVM), C#™ runtime, or any other runtime, interpreter, virtual machine, or execution engine running on the computer system 1400. In some embodiments, the code 1425 may include instructions written in a scripting language or interpreted language, such as JavaScript™, ActiveScript™, VBScript™, Perl™, and so forth. In such cases, the code 1425 may execute within a runtime, interpreter, virtual machine, scripting engine, or other process that executes on the computer system 1400.

The code 1425 may include instructions to implement one or more of the e-commerce application 108, the client process 106, the contract engine 112, or the network service(s) 120. The code 1425 may also include instructions to implement at least one operating system (OS) that executes on the computer system 1400. The at least one OS may include one or more of the following: any version of the UNIX™ OS; any version of the Linux™ OS; any version of iOS™ or OSX™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The system memory 1420 may include data 1426 employed during operations of the computer system 1400. The data 1426 may include one or more of the following: the transaction request 110, the request(s) 130, the transaction data 126, the data object(s) 124, the service call(s) 118, the aggregate contract data object 116, the change tracking data 128, the configuration data 132, or the callback information 1002. The data 1426 may be stored in any format. In some embodiments, at least a portion of the data 1426 may be stored externally to the computer system 1400, on one or more other devices or storage media that may communicate with the computer system 1400 via the network interface(s) 1440, the I/O interface(s) 1430, or the I/O device(s) 1470. The system memory 1420 may include persistent storage such as one or more hard drives, tape drives, solid state memory, other mass storage devices, or any other persistent storage device. The system memory 1420 may also include active memory, physical memory, or virtual memory that is employed by processes executing on the computer system 1400. The system memory 1420 may include cache memory.

The system memory 1420 may comprise one or more non-transitory storage media that store information such as one or both of the code 1425 or the data 1426. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Embodiments may include software comprising one or both of the code 1425 or the data 1426 stored on the system memory 1420 that comprises one or more non-transitory storage media. Such software may be used to program the computer system 1400, or other electronic devices, to perform one or more operations according to various embodiments.

Embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 1440 and employed to program the computer system 1400, or other electronic devices, to perform one or more operations according to various embodiments.

The I/O interface(s) 1430 may be configured to coordinate I/O traffic between the processor(s) 1410, the system memory 1420, and any peripheral devices accessible to the computer system 1400 through the network interface(s) 1440 or other peripheral interface(s). In some embodiments, the I/O interface(s) 1430 may perform protocol, timing or other data transformations to convert data from one component (e.g., the system memory 1420) into a format suitable for use by another component (e.g., the processor(s) 1410). In some embodiments, the I/O interface(s) 1430 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 1430 may be split into two or more separate components, such as a north bridge and a south bridge. Moreover, in some embodiments at least some of the functionality of I/O interface(s) 1430, such as an interface to the system memory 1420, may be incorporated directly into the processor(s) 1410.

The computer system 1400 may include one or more network interfaces 1440 coupled to the I/O interface(s) 1430. The one or more network interfaces 1440 may be employed by the various components or software of the computer system 1400 to communicate with other systems and/or components over one or more communications networks 1450. The network interface(s) 1440 may include one or more network interface controllers (NICs), transceiver devices, or other types of network communications devices configured to send and receive communications over the network(s) 1450.

The computer system 1400 may employ the network interface(s) 1440 to communicate and exchange data with one or more other devices 1460 over the network(s) 1450. The network interface(s) 1440 may support one or more wireless networking protocols such as any version of the Institute of Electrical and Electronics Engineers (IEEE) 802.11 standard or other wireless networking standard. The network interface(s) 1440 may also support communication via any wired data networks, such as Ethernet networks. The network interface(s) 1440 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 1440 may be configured to enable communication between the computer system 1400 and one or more I/O devices 1470, or between the computer system 1400 and external (e.g., remote) storage device(s). The I/O device(s) 1470 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 1470 may include one or more data output devices such as a display, an audio output device (e.g., a speaker), a printer, a haptic output device, and so forth.

The I/O device(s) 1470 may be components of all the devices included in the computer system 1400 or may be components of different devices that comprise the computer system 1400. The I/O device(s) 1470 may be physically incorporated with the computer system 1400. In some embodiments, one or more of the I/O device(s) 1470 may be externally placed relative to the computer system 1400 and may communicate with the computer system 1400 using a wired or wireless connection, such as over the network interface(s) 1440. In various embodiments, the computer system 1400 may include more, fewer, or different components than those illustrated in FIG. 14.

The network(s) 1450 may include public networks such as the Internet, private networks such as an institutional or personal intranet, or some combination of private and public networks. The network(s) 1450 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 1450 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 1450 may be employed for communications between any of the processes or devices depicted in FIGS. 1-13.

The various elements depicted in the figures may be configured similarly to like-numbered elements, or may perform similar operations to those performed by like-numbered elements. The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Embodiments of the disclosure can be described in view of the following clauses:

Clause 1: A method comprising:
accessing a transaction request describing a transaction to purchase a plurality of items, the transaction request entered through an e-commerce application;
initializing an aggregate contract data object to store transaction data regarding the transaction;
identifying a plurality of network services that are executable by one or more computing devices, the plurality of network services configured to operate independently of one another to generate a plurality of data objects to include in the aggregate contract data object;
accessing configuration information for a network service of the plurality of network services, the configuration information describing a parallel processing capability of the network service;
based at least partly on the configuration information, determining at least two subsets of the plurality of items, the at least two subsets comprising non-overlapping subsets;
performing at least two calls to cause at least two instances of the network service to execute in parallel to generate at least two data objects, each of the at least two data objects including at least a portion of the transaction data corresponding to one of the at least two subsets of the plurality of items; and
incorporating the at least two data objects into the aggregate contract data object.

Clause 2: The method of clause 1, further comprising:
determining that the network service failed to generate a data object in response to a call within a time period;
accessing the configuration information for the network service, the configuration information further describing, for the network service, a tier classification from among a plurality of tier classifications, the plurality of tier classifications corresponding to a plurality of criticality levels for the plurality of network services;
based on the tier classification being a first tier classification, sending a failure message in response to the transaction request, the failure message indicating a failure of the transaction; and
based on the tier classification being a second tier classification, incorporating a default data object into the aggregate contract data object as a placeholder for the data object that would be successfully generated by the network service in response to the call, wherein the first tier classification indicates a criticality level lower than that indicated by the second tier classification.

Clause 3: The method of one or more of clauses 1 or 2, further comprising:
based on the tier classification being a second tier classification, performing a subsequent call to cause the network service to generate the data object; and
incorporating the data object into the aggregate contract data object in place of the default data object.

Clause 4: The method of one or more of clauses 1-3, further comprising:
prior to calling the network service, registering the network service to be callable for generating the data object, wherein the registering comprises:
generating the configuration information to describe the parallel processing capability of the network service; and
generating the configuration information to describe the tier classification for the network service.

Clause 5: A system comprising:
one or more computing devices configured to provide one or more services, the one or more services configured to:
access a transaction request describing a transaction associated with a plurality of items;
identify a plurality of network services that are configured to operate independently of one another to generate a plurality of data objects to include in an aggregate data object;
determine at least two subsets of the plurality of items, the at least two subsets comprising non-overlapping subsets;
perform at least two calls to at least two instances of a network service of the plurality of network services, wherein the at least two calls cause the at least two instances of the network service to execute in parallel to generate at least two data objects, each of the at least two data objects including at least a portion of the transaction data corresponding to one of the at least two subsets of the plurality of items; and
incorporate, into the aggregate data object, the transaction data included in the at least two data objects.

Clause 6: The system of clause 5, wherein:
the one or more services are further configured to access configuration information describing a parallel processing capability of the network service; and
the determining of the at least two subsets of the plurality of items is based, at least partly, on semantic grouping information corresponding to the parallel processing capability of the network service.

Clause 7: The system of one or more of clauses 5 or 6, wherein the one or more services are further configured to:
determine that the network service failed to generate a data object in response to a call;
determine, for the network service, a tier classification from among a plurality of tier classifications, the plurality of tier classifications corresponding to a plurality of criticality levels for the plurality of network services;
based on the tier classification being a first tier classification, send a failure message in response to the transaction request, the failure message indicating a failure of the transaction; and
based on the tier classification being a second tier classification, incorporate a default data object into the aggregate data object as a placeholder for the data object that would be successfully generated by the network service in response to the call, wherein the first tier classification indicates a criticality level higher than that indicated by the second tier classification.

Clause 8: The system of one or more of clauses 5-7, wherein the one or more services are further configured to:

based on the tier classification being a second tier classification, perform a subsequent call to cause the network service to generate the data object, the subsequent call being performed responsive to a request for the transaction data generated by the network service; and incorporate the data object into the aggregate data object in place of the default data object.

Clause 9: The system of one or more of clauses 5-8, wherein the one or more services are further configured to:

prior to calling the network service, register the network service to be callable for generating the data object; and during the registering, generate configuration information that describes the tier classification of the network service.

Clause 10: The system of one or more of clauses 5-9, wherein the one or more services are further configured to:

combine the transaction data included in the at least two data objects to generate a combined data object; and incorporate the combined data object into the aggregate data object.

Clause 11: The system of one or more of clauses 5-10, wherein:

the network service is configured to determine an estimated delivery date for one or more items;

a first subset of the at least two subsets includes one or more items being delivered to a first location;

a second subset of the at least two subsets includes one or more items being delivered to a second location;

a first data object of the at least two data objects includes the estimated delivery date for the first subset;

a second data object of the at least two data objects includes the estimated delivery date for the second subset; and the combined data object includes the estimated delivery date for the first subset and the estimated delivery date for the second subset.

Clause 12: The system of one or more of clauses 5-11, wherein the plurality of network services are configured to perform one or more of the following operations:

determine an estimated delivery date for one or more items;

determine an availability of one or more items;

determine a seller of one or more items;

calculate a tax amount for one or more items;

calculate a total price for one or more items; or determine gift information for one or more items.

Clause 13: The system of one or more of clauses 5-12, wherein the one or more services are further configured to:

prior to calling the network service, register the network service to be callable for generating the data object;

during the registering, generate configuration information that describes a parallel processing capability of the network service; and determine at least two subsets of the plurality of items based at least partly on the parallel processing capability of the network service.

Clause 14: One or more computer-readable media storing instructions which, when executed by one or more processors, instruct the one or more processors to perform actions comprising:

accessing a transaction request describing a transaction associated with a plurality of items;

determining at least two subsets of the plurality of items;

performing at least two calls to at least two instances of a network service, wherein the at least two calls cause the at least two instances of the network service to execute in parallel to generate at least two data objects, each of the at least two data objects including at least a portion of the transaction data corresponding to one of the at least two subsets of the plurality of items; and incorporating, into an aggregate data object, the transaction data included in the at least two data objects.

Clause 15: The one or more computer-readable media of clause 14, wherein the actions further comprise:

determining that the network service failed, within a time period, to generate a data object in response to a call;

determining, for the network service, a tier classification from among a plurality of tier classifications, the plurality of tier classifications corresponding to a plurality of criticality levels for a plurality of network services;

based on the tier classification being a first tier classification, sending a failure message in response to the transaction request, the failure message indicating a failure of the transaction; and based on the tier classification being a second tier classification, incorporating into the aggregate data object a default data object comprising default transaction data, the default data object being a placeholder for the data object that would be successfully generated by the network service in response to the call, wherein the first tier classification indicates a criticality level lower than that indicated by the second tier classification.

Clause 16: The one or more computer-readable media of one or more of clauses 14 or 15, wherein the actions further comprise:

based on the tier classification being a second tier classification, performing a subsequent call to cause the network service to generate the data object; and incorporating the data object into the aggregate data object in place of the default data object.

Clause 17: The one or more computer-readable media of one or more of clauses 14-16, wherein the actions further comprise:

prior to calling the network service, registering the network service to be callable for generating the data object; and during the registering, generating configuration information that includes the tier classification of the network service.

Clause 18: The one or more computer-readable media of one or more of clauses 14-17, wherein the configuration information further includes the default transaction data for the network service.

Clause 19: The one or more computer-readable media of one or more of clauses 14-18, wherein the network service is configured to perform one or more of the following operations:

determine an estimated delivery date for one or more items;

determine an availability of one or more items;

determine a seller of one or more items;

calculate a tax amount for one or more items;

calculate a total price for one or more items; or determine gift information for one or more items.

Clause 20: The one or more computer-readable media of one or more of clauses 14-19, wherein:

the transaction request describes the transaction to purchase the plurality of items;

the transaction request is generated using an e-commerce application; and the e-commerce application comprises one or more of:

a web application presented in a browser module executing on an end-user computing device; or a native application executing the end-user computing device.

Clause 21: A method comprising:

accessing a transaction request describing a transaction to purchase a plurality of items, the transaction request entered through an e-commerce application, the transaction request sent by a client configured to determine content to be presented within the e-commerce application;

performing a plurality of calls to cause a plurality of network services to execute to generate a plurality of data objects comprising transaction data regarding the transaction;

on receiving individual ones of the plurality of data objects from the plurality of network services, incorporating the individual ones of the plurality of data objects into an aggregate contract data object; and asynchronously with respect to the transaction request, providing to the client at least a portion of the transaction data stored in the aggregate contract data object, the providing comprising one or more of:

providing at least the portion of the transaction data to the client in a synchronous response to a request from the client; or asynchronously providing the transaction data stored in the aggregate contract data object to the client using callback information provided by the client in the transaction request, the callback information indicating a network location of the client.

Clause 22: The method of clause 21, wherein synchronously providing at least the portion of the transaction data further comprises:

receiving, from the client, the request indicating the portion of the transaction data to be provided to the client, the request received subsequent to the transaction request;

responsive to determining that the portion of the transaction data has not yet been incorporated into the aggregate contract data object, blocking on the request; and sending the portion of the transaction data to the client in response to the request, responsive to determining that the portion of the transaction data has been incorporated into the aggregate contract data object.

Clause 23: The method of one or more of clauses 21 or 22, wherein asynchronously providing at least the portion of the transaction data further comprises:

responsive to determining that the transaction data included in the plurality of data objects has been incorporated into the aggregate contract data object, sending the transaction data to the network location specified in the callback information; and responsive to determining that at least one of the plurality of network services failed to generate at least one of the plurality of data objects, sending a failure message to the client, the failure message indicating a failure of the transaction.

Clause 24: The method of one or more of clauses 21-23, further comprising:

based at least partly on a size of the transaction data stored in the aggregate contract data object, determining whether to:

provide at least the portion of the transaction data to the client in the synchronous response to the request from the client; or asynchronously provide the transaction data stored in the aggregate contract data object to the client using the callback information provided by the client in the transaction request.

Clause 25: A system comprising:

one or more computing devices configured to provide one or more services, the one or more services configured to:

access a transaction request describing a transaction associated with a plurality of items, the transaction request sent by a client;

perform a plurality of calls to cause a plurality of network services to execute to generate a plurality of data objects comprising transaction data regarding the transaction;

on receiving individual ones of the plurality of data objects from the plurality of network services, incorporate the individual ones of the plurality of data objects into an aggregate data object; and asynchronously with respect to the transaction request, provide to the client at least a portion of the transaction data stored in the aggregate data object, responsive to determining that at least the portion of the transaction data has been incorporated into the aggregate data object.

Clause 26: The system of clause 25, wherein to provide at least the portion of the transaction data, the one or more services are further configured to:

receive, from the client, a request indicating the portion of the transaction data to be provided to the client, the request received subsequent to the transaction request;

block on the request until the portion of the transaction data has been incorporated into the aggregate data object; and send the portion of the transaction data to the client in response to the request, responsive to determining that the portion of the transaction data has been incorporated into the aggregate data object.

Clause 27: The system of one or more of clauses 25 or 26, wherein to provide at least the portion of the transaction data, the one or more services are further configured to:

determine that the portion of the transaction data has not been incorporated into the aggregate data object; and periodically poll the aggregate data object until the portion of the transaction data has been incorporated into the aggregate data object.

Clause 28: The system of one or more of clauses 25-27, wherein the one or more services are further configured to periodically poll the aggregate data object with a frequency that corresponds to a size of the portion of the transaction data to be provided to the client.

Clause 29: The system of one or more of clauses 25-28, wherein the one or more services are further configured to:

determine that at least one of the plurality of network services failed to generate at least one of the plurality of data objects; and send a failure message to the client in response to the request, the failure message indicating a failure of the transaction, the failure message including one or more of error information or exception information generated by the at least one of the plurality of network services that failed.

Clause 30: The system of one or more of clauses 25-29, wherein to provide at least the portion of the transaction data, the one or more services are further configured to:

asynchronously with respect to the transaction request, provide at least the portion of the transaction data stored in the aggregate data object to the client using callback information provided by the client in the transaction request, the callback information indicating a network location of the client.

Clause 31: The system of one or more of clauses 25-30, wherein the callback information comprises one or more of:
  a uniform resource identifier (URI) of the client;
  a network address of a computing device where the client executes;
  a host name of the computing device where the client executes; or
  a port number of the computing device at which the client is configured to receive communications.

Clause 32: The system of one or more of clauses 25-31, wherein the one or more services are further configured to:
  determine that at least one of the plurality of network services failed to generate at least one of the plurality of data objects; and
  asynchronously with respect to the transaction request, send a failure message to the client, the failure message indicating a failure of the transaction.

Clause 33: The system of one or more of clauses 25-32, wherein the transaction data included in the plurality of data objects comprises one or more of:
  an estimated delivery date for one or more items;
  an availability of one or more items;
  a seller of one or more items;
  a tax amount for one or more items;
  a total price for one or more items; or
  gift information for one or more items.

Clause 34: One or more computer-readable media storing instructions which, when executed by one or more processors, instruct the one or more processors to perform actions comprising:
  generating a transaction request describing a transaction to purchase of a plurality of items, the transaction request generated responsive to information entered through an e-commerce application;
  providing the transaction request to a contract engine; and
  asynchronously with respect to the providing of the transaction request to the contract engine, receiving transaction data regarding the transaction from the contract engine, wherein the receiving of the transaction data comprises one or more of:
    synchronously receiving the transaction data in response to a request sent to the contract engine, the request identifying the transaction data; or
    asynchronously receiving the transaction data at a network location specified in callback information included in the transaction request.

Clause 35: The one or more computer-readable media of clause 34, wherein the transaction data is received from the contract engine after having been stored by the contract engine in an aggregate contract data object populated by a plurality of data objects generated by a plurality of network services called by the contract engine.

Clause 36: The one or more computer-readable media of one or more of clauses 34 or 35, wherein:
  at least a portion of the received transaction data includes default transaction data, indicating that at least one network service has not completed generating a data object to include actual transaction data; and
  the actions further comprise subsequently receiving the actual transaction data from the contract engine, after the at least one network service has completed generating the data object.

Clause 37. The one or more computer-readable media of one or more of clauses 34-36, wherein the callback information comprises one or more of:
  a uniform resource identifier (URI);
  a network address;
  a host name; or
  a port number.

Clause 38. The one or more computer-readable media of one or more of clauses 34-37, the actions further comprising:
  causing at least a portion of the transaction data to be presented in the e-commerce application.

Clause 39: The one or more computer-readable media of one or more of clauses 34-38, wherein the e-commerce application comprises one or more of:
  a web application presented in a browser module executing on an end-user computing device; or
  a native application executing the end-user computing device.

Clause 40. The one or more computer-readable media of one or more of clauses 34-39, wherein the transaction data comprises one or more of:
  an estimated delivery date for one or more items;
  an availability of one or more items;
  a seller of one or more items;
  a tax amount for one or more items;
  a total price for one or more items; or
  gift information for one or more items.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method comprising:
  accessing a transaction request describing a transaction to purchase a plurality of items, the transaction request entered through an e-commerce application;
  initializing an aggregate contract data object to store transaction data regarding the transaction;
  identifying a plurality of network services that are executable by one or more computing devices, the plurality of network services configured to operate independently of one another to generate a plurality of data objects to include in the aggregate contract data object;
  accessing configuration information for a network service of the plurality of network services, the configuration information describing a parallel processing capability of the network service;
  based at least partly on the configuration information, determining at least two subsets of the plurality of items, the at least two subsets comprising non-overlapping subsets;
  performing at least two calls to cause at least two instances of the network service to execute in parallel to generate at least two data objects, each of the at least two data objects including at least a portion of the transaction data corresponding to one of the at least two subsets of the plurality of items; and
  incorporating the at least two data objects into the aggregate contract data object.

2. The method of claim 1, further comprising:
  determining that the network service failed to generate a data object in response to a call within a time period;
  accessing the configuration information for the network service, the configuration information further describing, for the network service, a tier classification from among a plurality of tier classifications, the plurality of tier classifications corresponding to a plurality of criticality levels for the plurality of network services;

based on the tier classification being a first tier classification, sending a failure message in response to the transaction request, the failure message indicating a failure of the transaction; and based on the tier classification being a second tier classification, incorporating a default data object into the aggregate contract data object as a placeholder for the data object that would be successfully generated by the network service in response to the call, wherein the first tier classification indicates a criticality level lower than that indicated by the second tier classification.

3. The method of claim 2, further comprising:

based on the tier classification being a second tier classification, performing a subsequent call to cause the network service to generate the data object; and incorporating the data object into the aggregate contract data object in place of the default data object.

4. The method of claim 2, further comprising:

prior to calling the network service, registering the network service to be callable for generating the data object, wherein the registering comprises:

generating the configuration information to describe the parallel processing capability of the network service; and generating the configuration information to describe the tier classification for the network service.

5. A system, comprising:

one or more computing devices comprising one or more hardware processors and memory and configured to provide one or more services, the one or more services configured to:

access a transaction request describing a transaction associated with a plurality of items;

identify a plurality of network services that are configured to operate independently of one another to generate a plurality of data objects to include in an aggregate data object;

determine at least two subsets of the plurality of items, the at least two subsets comprising non-overlapping subsets;

perform at least two calls to at least two instances of a network service of the plurality of network services, wherein the at least two calls cause the at least two instances of the network service to execute in parallel to generate at least two data objects, each of the at least two data objects including at least a portion of the transaction data corresponding to one of the at least two subsets of the plurality of items; and incorporate, into the aggregate data object, the transaction data included in the at least two data objects.

6. The system of claim 5, wherein:

the one or more services are further configured to access configuration information describing a parallel processing capability of the network service; and the determining of the at least two subsets of the plurality of items is based, at least partly, on semantic grouping information corresponding to the parallel processing capability of the network service.

7. The system of claim 5, wherein the one or more services are further configured to:

determine that the network service failed to generate a data object in response to a call;

determine, for the network service, a tier classification from among a plurality of tier classifications, the plurality of tier classifications corresponding to a plurality of criticality levels for the plurality of network services;

based on the tier classification being a first tier classification, send a failure message in response to the transaction request, the failure message indicating a failure of the transaction; and based on the tier classification being a second tier classification, incorporate a default data object into the aggregate data object as a placeholder for the data object that would be successfully generated by the network service in response to the call, wherein the first tier classification indicates a criticality level higher than that indicated by the second tier classification.

8. The system of claim 7, wherein the one or more services are further configured to:

based on the tier classification being a second tier classification, perform a subsequent call to cause the network service to generate the data object, the subsequent call being performed responsive to a request for the transaction data generated by the network service; and incorporate the data object into the aggregate data object in place of the default data object.

9. The system of claim 7, wherein the one or more services are further configured to:

prior to calling the network service, register the network service to be callable for generating the data object; and during the registering, generate configuration information that describes the tier classification of the network service.

10. The system of claim 5, wherein the one or more services are further configured to:

combine the transaction data included in the at least two data objects to generate a combined data object; and incorporate the combined data object into the aggregate data object.

11. The system of claim 10, wherein:

the network service is configured to determine an estimated delivery date for one or more items;

a first subset of the at least two subsets includes one or more items being delivered to a first location;

a second subset of the at least two subsets includes one or more items being delivered to a second location;

a first data object of the at least two data objects includes the estimated delivery date for the first subset;

a second data object of the at least two data objects includes the estimated delivery date for the second subset; and the combined data object includes the estimated delivery date for the first subset and the estimated delivery date for the second subset.

12. The system of claim 5, wherein the plurality of network services are configured to perform one or more of the following operations:

determine an estimated delivery date for one or more items;

determine an availability of one or more items;

determine a seller of one or more items;

calculate a tax amount for one or more items;

calculate a total price for one or more items; or determine gift information for one or more items.

13. The system of claim 5, wherein the one or more services are further configured to:

prior to calling the network service, register the network service to be callable for generating the data object;

during the registering, generate configuration information that describes a parallel processing capability of the network service; and determine at least two subsets of the plurality of items based at least partly on the parallel processing capability of the network service.

14. One or more non-transitory computer-readable media storing instructions which, when executed by one or more processors, instruct the one or more processors to perform actions comprising:
    accessing a transaction request describing a transaction associated with a plurality of items;
    determining at least two subsets of the plurality of items;
    performing at least two calls to at least two instances of a network service, wherein the at least two calls cause the at least two instances of the network service to execute in parallel to generate at least two data objects, each of the at least two data objects including at least a portion of the transaction data corresponding to one of the at least two subsets of the plurality of items; and
    incorporating, into an aggregate data object, the transaction data included in the at least two data objects.

15. The one or more non-transitory computer-readable media of claim 14, wherein the actions further comprise:
    determining that the network service failed, within a time period, to generate a data object in response to a call;
    determining, for the network service, a tier classification from among a plurality of tier classifications, the plurality of tier classifications corresponding to a plurality of criticality levels for a plurality of network services;
    based on the tier classification being a first tier classification, sending a failure message in response to the transaction request, the failure message indicating a failure of the transaction; and
    based on the tier classification being a second tier classification, incorporating into the aggregate data object a default data object comprising default transaction data, the default data object being a placeholder for the data object that would be successfully generated by the network service in response to the call, wherein the first tier classification indicates a criticality level lower than that indicated by the second tier classification.

16. The one or more non-transitory computer-readable media of claim 15, wherein the actions further comprise:
    based on the tier classification being a second tier classification, performing a subsequent call to cause the network service to generate the data object; and
    incorporating the data object into the aggregate data object in place of the default data object.

17. The one or more non-transitory computer-readable media of claim 15, wherein the actions further comprise:
    prior to calling the network service, registering the network service to be callable for generating the data object; and
    during the registering, generating configuration information that includes the tier classification of the network service.

18. The one or more non-transitory computer-readable media of claim 17, wherein the configuration information further includes the default transaction data for the network service.

19. The one or more non-transitory computer-readable media of claim 14, wherein the network service is configured to perform one or more of the following operations:
    determine an estimated delivery date for one or more items;
    determine an availability of one or more items;
    determine a seller of one or more items;
    calculate a tax amount for one or more items;
    calculate a total price for one or more items; or
    determine gift information for one or more items.

20. The one or more non-transitory computer-readable media of claim 14, wherein:
    the transaction request describes the transaction to purchase the plurality of items;
    the transaction request is generated using an e-commerce application; and
    the e-commerce application comprises one or more of:
        a web application presented in a browser module executing on an end-user computing device; or
        a native application executing the end-user computing device.

* * * * *